United States Patent
Yoshida

(10) Patent No.: US 8,349,509 B2
(45) Date of Patent: Jan. 8, 2013

(54) FUEL CELL SYSTEM AND FUEL CELL SYSTEM FAILURE JUDGMENT METHOD

(75) Inventor: Naohiro Yoshida, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1235 days.

(21) Appl. No.: 11/662,578

(22) PCT Filed: Sep. 16, 2005

(86) PCT No.: PCT/JP2005/017560
§ 371 (c)(1),
(2), (4) Date: Mar. 12, 2007

(87) PCT Pub. No.: WO2006/033425

PCT Pub. Date: Mar. 30, 2006

(65) Prior Publication Data
US 2007/0202367 A1 Aug. 30, 2007

(30) Foreign Application Priority Data
Sep. 22, 2004 (JP) .................................. 2004-275410

(51) Int. Cl.
*H01M 8/04* (2006.01)
(52) U.S. Cl. ........ 429/444; 429/428; 429/429; 429/430; 429/434
(58) Field of Classification Search .................... 429/13, 429/428–430, 434, 444
See application file for complete search history.

(56) References Cited

U.S. PATENT DOCUMENTS

| 6,555,989 B1 * | 4/2003 | Pearson ......................... 320/101 |
| 2002/0146606 A1 * | 10/2002 | Kobayashi et al. ............. 429/24 |
| 2004/0099048 A1 | 5/2004 | Miura et al. |
| 2004/0101724 A1 | 5/2004 | Imamura et al. |
| 2005/0227125 A1 * | 10/2005 | Shaffer et al. ................... 429/13 |
| 2007/0029123 A1 * | 2/2007 | Hochgraf ..................... 180/65.3 |

FOREIGN PATENT DOCUMENTS
JP A 8-329965 12/1996
(Continued)

OTHER PUBLICATIONS
Machine translation of JP 2003308866 A, Ino et al. Oct. 2003.*
(Continued)

*Primary Examiner* — Basia Ridley
*Assistant Examiner* — Sean P Cullen
(74) *Attorney, Agent, or Firm* — Oliff & Berridge, PLC

(57) ABSTRACT

A fuel cell system is provided with a judgment unit which makes a gas leak judgment based on a pressure drop of fuel gas in a gas leak detection portion by consuming the fuel gas in the gas leak detection portion of the fuel gas supply system by electric power generation of a fuel cell and causing auxiliary devices to consume the electric power generated by the fuel cell, and comprises a control unit which increases consumption of the fuel gas in the gas leak detection portion by increasing the electric power consumption of the auxiliary devices. With this arrangement, where the electric power generation of the fuel cell and the electric power consumption of the auxiliary devices result in an insufficient consumption of the fuel gas, the consumption of the fuel gas can be accelerated by increasing the electric power consumption of the auxiliary devices. Thereby, a rapid gas leak judgment can be achieved.

20 Claims, 14 Drawing Sheets

FOREIGN PATENT DOCUMENTS

| | | |
|---|---|---|
| JP | A 2000-274311 | 10/2000 |
| JP | A 2003-308866 | 10/2003 |
| JP | A 2003-308868 | 10/2003 |
| JP | A 2004-95425 | 3/2004 |
| JP | A 2004-170321 | 6/2004 |
| JP | A 2004-186137 | 7/2004 |

OTHER PUBLICATIONS

Ino et al., Partial human translation of JP 2003-308868 A, Oct. 2003.*

* cited by examiner

FUEL CELL SYSTEM AND FUEL CELL SYSTEM FAILURE JUDGMENT METHOD

BACKGROUND

The present invention relates to a fuel cell system and a fuel cell system failure judgment method, and more particularly to an improved technology for use in performing failure detection and judgment in a reaction gas passage accurately in a short time.

As a power generating system for a fuel cell hybrid vehicle, there has been used a fuel cell system capable of directly deriving chemical energy, which has been generated by a redox reaction of reaction gas (fuel gas or oxidant gas), as electric energy. In this type of fuel cell system, various shut-off valves (for example, a high-pressure hydrogen tank valve, a hydrogen supply valve, an FC inlet valve, an FC outlet valve, a purge valve, and the like) are arranged in a fuel gas supply passage for use in supplying fuel gas from a hydrogen supply source to a fuel cell.

As a failure diagnosis technique for these various shut-off valves, for example, Japanese Patent Laid-Open No. 2000-274311 has suggested a technology of creating a closed space in a fuel gas supply passage of a vehicle by closing a shut-off valve arranged in the fuel gas supply passage and determining a valve failure when a pressure drop rate of the closed space with respect to elapsed time is lower than a pressure drop rate threshold.

The pressure drop rate in the downstream of the shut-off valve varies according to a driving condition of the vehicle, namely a fuel consumption rate. Therefore, where the fuel consumption rate decreases according to the vehicle driving condition, a lot of time is required to reduce the pressure in the downstream of the shut-off valve, which inhibits rapid failure diagnosis.

In view of the above background of the invention, Japanese Patent Laid-Open No. 2003-308868 has suggested a technology of increasing a fuel consumption rate to reduce the pressure in the downstream of a shut-off valve in a short time by increasing the electric power consumption of auxiliary devices mounted on a vehicle when performing a failure diagnosis of the shut-off valve. Furthermore, it has disclosed that a combustion chamber is used to consume the fuel if the fuel consumption is insufficient only with the electric power consumption of the auxiliary devices.

[Patent Document 1] Japanese Patent Laid-Open No. 2000-274311
[Patent Document 2] Japanese Patent Laid-Open No. 2003-308868

SUMMARY

In the case of insufficient fuel consumption of the fuel cell and the combustion chamber, however, a lot of time is required until the pressure of the fuel gas supply system decreases, which inhibits rapid failure detection in a reaction gas passage. Moreover, the technology disclosed in Japanese Patent Laid-Open No. 2003-308868 requires a previous reduction in the amount of energy stored in energy storage means before the failure diagnosis so that electric power obtained by the failure diagnosis can be stored in the energy storage means, which inhibits rapid failure diagnosis.

Therefore, it is an object of the present invention to solve the above problem and to provide a fuel cell system capable of performing failure detection and judgment in a reaction gas passage accurately in a short time.

To solve the above problem, a fuel cell system according to the present invention, which is provided with a judgment unit (judgment means) which makes a failure judgment in a reaction gas passage based on a pressure changing state of reaction gas in a failure detection portion by consuming the reaction gas in the failure detection portion of the reaction gas passage by means of a fuel cell and causing auxiliary devices to consume electric power generated by the fuel cell, comprises a control unit (control means) which increases consumption of the reaction gas in the failure detection portion by increasing the electric power consumption of the auxiliary devices.

With this arrangement, where the electric power generation of the fuel cell and the electric power consumption of the auxiliary devices result in an insufficient consumption of the reaction gas, the reaction gas consumption can be accelerated by increasing the electric power consumption of the auxiliary devices. Thereby, a rapid failure judgment can be achieved.

Preferably the fuel cell system according to the present invention further comprises an auxiliary cooler for cooling the fuel cell as one of the auxiliary devices and the control unit controls other auxiliary devices based on a degree of decrease in temperature of the fuel cell caused by an increase in the electric power consumption of the auxiliary cooler.

An increase in the electric power consumption of the auxiliary cooler decreases the temperature of the fuel cell along with an improvement of a cooling capacity for cooling the fuel cell. Therefore, a satisfactory electric power generation state can be maintained by controlling other auxiliary devices in such a way as to counteract a factor (for example, a cell voltage drop caused by flooding or drying up) of preventing the electric power generation caused along with the temperature drop.

Preferably the fuel cell system according to the present invention further comprises an air compressor for supplying oxidant gas to the fuel cell as one of the auxiliary devices and the control unit inhibits an increase in the flow rate of oxidant gas supplied from the air compressor to the fuel cell if the temperature of the fuel cell is equal to or higher than a predetermined value.

Increasing the flow rate of the oxidant gas supplied to the fuel cell when the temperature of the fuel cell is equal to or higher than the predetermined value causes drying up of a membrane-electrode assembly (MEA). Therefore, in such case, it is preferable to inhibit the increase in the flow rate of the oxidant gas.

Preferably the fuel cell system according to the present invention further comprises a heat exchanger capable of exchanging heat with refrigerant which cools the fuel cell as one of the auxiliary devices and the control unit raises the temperature of the refrigerant by increasing the electric power consumption of the heat exchanger if the temperature of the fuel cell is equal to or lower than a predetermined value.

Surplus power can be consumed also during electric power consumption of the heat exchanger in addition to the electric power consumption of the auxiliary cooler. Therefore, the fuel gas can be consumed more rapidly.

Preferably the fuel cell system according to the present invention further comprises an inverter for converting DC power generated by the fuel cell to AC power and then supplying the AC power to the auxiliary devices, and the control unit increases a heat loss of the inverter to increase the consumption of the electric power generated by the fuel cell.

The electric power conversion efficiency can be decreased intentionally by adjusting an inverter frequency so as to increase the electric power consumption caused by the heat loss.

A failure judgment method of a fuel cell system according to the present invention in which a failure judgment in a reaction gas passage is made based on a pressure changing state of reaction gas in a failure detection portion by consuming the reaction gas in the failure detection portion of the reaction gas passage by means of a fuel cell and causing auxiliary devices to consume electric power generated by the fuel cell, the method comprising the step of increasing consumption of the reaction gas in the failure detection portion by increasing the electric power consumption of the auxiliary devices.

In the failure judgment method of the fuel cell system according to the present invention, the fuel cell system can include an auxiliary cooler for cooling the fuel cell as one of the auxiliary devices and other auxiliary devices can be controlled based on a degree of decrease in temperature of the fuel cell caused by an increase in the electric power consumption of the auxiliary cooler.

In the failure judgment method of the fuel cell system according to the present invention, the fuel cell system can further include an air compressor for supplying oxidant gas to the fuel cell as one of the auxiliary devices and an increase in the flow rate of oxidant gas supplied from the air compressor to the fuel cell can be inhibited if the temperature of the fuel cell is equal to or higher than a predetermined value.

In the failure judgment method of the fuel cell system according to the present invention, the fuel cell system can further include a heat exchanger capable of exchanging heat with refrigerant which cools the fuel cell as one of the auxiliary devices and the temperature of the refrigerant can be raised by increasing the electric power consumption of the heat exchanger if the temperature of the fuel cell is equal to or lower than a predetermined value.

In the failure judgment method of the fuel cell system according to the present invention, the fuel cell system can further include an inverter for converting DC power generated by the fuel cell to AC power and then supplying the AC power to the auxiliary devices, and the consumption of the electric power generated by the fuel cell can be increased by increasing the heat loss of the inverter.

DETAILED DESCRIPTION OF EMBODIMENTS

Figure 1:
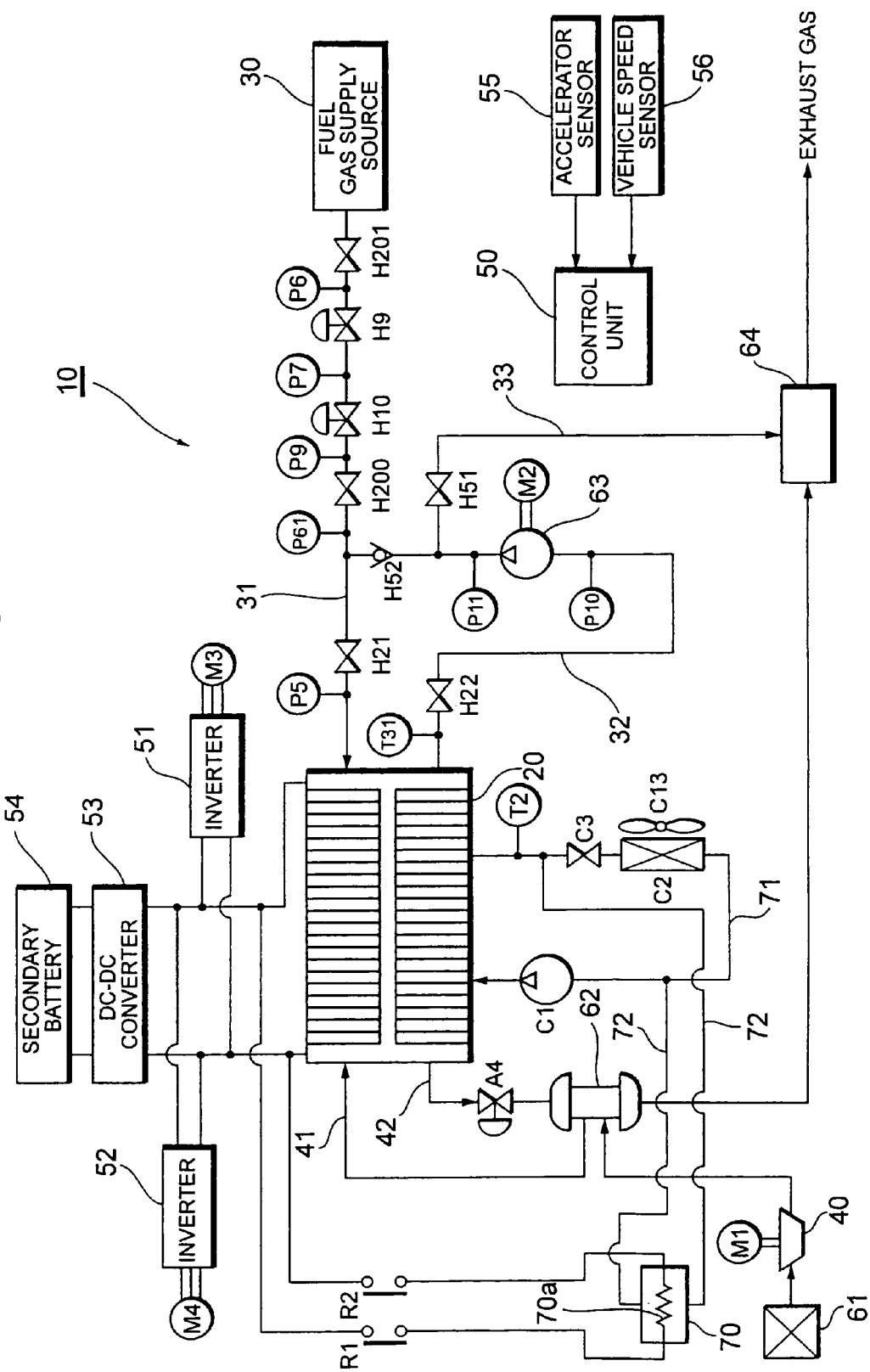
FIG. 1 is a configuration diagram of a fuel cell system according to this embodiment.

Referring to FIG. 1, there is shown an outline configuration of a fuel cell system according to this embodiment. While this specification describes an example in which a fuel cell system 10 is used as an on-board power generating system for a fuel cell hybrid vehicle (FCHV), it can also be used as a stationary power generating system. A fuel cell (fuel cell stack) 20 has a stack structure in which a plurality of single cells are stacked in series: for example, it includes solid polymer electrolyte fuel cells.

A fuel gas supply system (fuel gas pipeline) of the fuel cell 20 includes a fuel gas supply source 30, a fuel gas supply passage 31, and a fuel gas circulating passage 32 arranged therein. It should be noted here that the fuel gas supply system is a generic name given to gas piping and valves arranged in a passage for supplying fuel gas from the fuel gas supply source 30 to the fuel cell 20, for example, including the fuel gas supply source 30, the fuel gas supply passage 31 connecting the fuel gas supply source 30 to the fuel cell 20, and on-off valves and a regulator arranged in the fuel gas supply passage 31. In the case of using a system configuration in which fuel gas discharged from the fuel cell 20 is circulated in the fuel gas supply passage 31, the fuel gas supply system can further include the fuel gas circulating passage 32. The fuel gas supply source 30 includes, for example, a hydrogen storage source, such as a high-pressure hydrogen tank or a hydrogen storage tank, or a reformer for reforming materials to be reformed to hydrogen-rich gas. The fuel gas supply passage 31 is a gas passage for leading fuel gas released from the fuel gas supply source 30 to an anode of the fuel cell 20. In the gas passage, there are arranged a tank valve H201, a high pressure regulator H9, a low pressure regulator H10, a hydrogen supply valve H200, and an FC inlet valve H21 from the upstream to downstream of the gas passage. Fuel gas compressed to high pressure is decompressed to medium pressure by the high pressure regulator H9 and further decompressed to low pressure (normal operating pressure) by the low pressure regulator H10. The fuel gas circulating passage 32 is a return gas passage for flowing unresponsive fuel gas back to the fuel cell 20, including an FC outlet valve H22, a hydrogen pump 63, and a return check valve H52 arranged from the upstream to downstream of the gas passage. The low-pressure unresponsive fuel gas discharged from the fuel cell 20 is pressurized moderately by the hydrogen pump 63 and led to the fuel gas supply passage 31. The return check valve H52 inhibits a reverse flow of the fuel gas from the fuel gas supply passage 31 to the fuel gas circulating passage 32. An anode off-gas passage 33 is for use in venting hydrogen off-gas, which has been discharged from the fuel cell 20, to the outside of the system and a purge valve (venting means) 1151 is arranged in the gas passage.

The above tank valve H201, the hydrogen supply valve 11200, the FC inlet valve H21, the FC outlet valve H22, and the purge valve 1151 are shut valves for supplying or shutting off fuel gas to the gas passages 31 to 33 or the fuel cell 20, and they each are formed by a solenoid valve, for example. As this kind of solenoid valve, it is preferable to use an on-off valve or a linear valve whose valve opening can be linearly adjusted by PWM control, for example.

An air compressor (oxidant gas supply source) 40 and an oxidant gas supply passage 41 are arranged in an oxidant gas supply system (oxidant gas pipeline) of the fuel cell 20. It should be noted here that the oxidant gas supply system is a generic name given to gas piping and valves arranged in a passage for supplying oxidant gas from the air compressor 40 to the fuel cell 20, for example, including the air compressor 40, an oxidant gas supply passage 41 connecting the air compressor 40 to the fuel cell 20, and auxiliary devices (for example, a humidification module 62) arranged in the oxidant gas supply passage 41. The air compressor 40 compresses air taken from outside through an air filter 61 and supplies the compressed air as oxidant gas to a cathode of the fuel cell 20.

Oxidant off-gas after the cell reaction of the fuel cell 20 flows through a cathode off-gas passage 42 and is vented to the outside of the system. The oxidant off-gas contains moisture generated by the cell reaction in the fuel cell 20 and therefore has high humidity. The humidification module 62 exchanges moisture between the oxidant gas having low humidity flowing through the oxidant gas supply passage 41 and the oxidant off-gas having high humidity flowing through the cathode off-gas passage 42 and moderately humidifies the oxidant gas supplied to the fuel cell 20. The back pressure of the oxidant gas supplied to the fuel cell 20 is controlled by a pressure regulating valve A4 arranged in the vicinity of the outlet of the cathode of the cathode off-gas passage 42. The downstream of the cathode off-gas passage 42 is in communication with a diluter 64, so that oxidant off-gas is supplied to the diluter 64. The diluter 64 is also in communication with the downstream of the anode off-gas passage 33, so that hydrogen off-gas is vented to the outside of the system after the hydrogen off-gas is mixed and diluted with the oxidant off-gas.

A cooling system (refrigerant pipeline) of the fuel cell 20 includes a cooling channel 71, a circulating pump C1, a radiator C2, a bypass valve C3, and a heat exchanger 70 arranged therein. The circulating pump C1 circulates refrigerant that flows inside the fuel cell 20 through the cooling channel 71. In the cooling channel 71, there is provided a bypass channel 72 for guiding the refrigerant to the heat exchanger 70 bypassing the radiator C2. The radiator C2 decreases the temperature of the refrigerant by rotating a fan C13. The heat exchanger 70 is provided with a heater 70a and heats the heater 70a with electric power supplied from the fuel cell 20 to thereby increase the temperature of the refrigerant. The electric power supply from the fuel cell 20 to the heat exchanger 70 can be controlled by turning on or off relays R1 and R2. A radiator bypass valve C3 is arranged in the upstream of the radiator C2, so that the refrigerant temperature can be adjusted by controlling the flow rate of the refrigerant flowing toward the radiator C2 and the heat exchanger 70 with a control of the valve opening of the radiator bypass valve C3.

A part of the DC power generated by the fuel cell 20 is decreased in voltage by a DC-DC converter 53 and is supplied to a secondary battery (power storage means) 54. The secondary battery 54 plays a role of a regenerative energy source during braking of a vehicle or an energy buffer during load change accompanying acceleration or deceleration of the vehicle and it is formed by a nickel-cadmium battery, a nickel-hydrogen battery, a lithium secondary battery, or the like. Although a secondary battery is illustrated by an example as power storage means in this specification, it can also be a capacitor. A traction inverter 51 and an auxiliary inverter 52 convert DC power supplied from both or one of the fuel cell 20 and the secondary battery 54 to AC power and supply the AC power to a traction motor M3 and an auxiliary motor M4. The auxiliary motor M4 is a generic name given to a motor M2, which drives the hydrogen circulating pump 63, and a motor M1, which drives the air compressor 40, described later.

A control unit 50 obtains system requiring power (the total sum of vehicle operating power and auxiliary device power) on the basis of accelerator opening detected by an accelerator sensor 55 and a vehicle speed detected by a vehicle speed sensor 56 and controls the fuel cell system 10 in such a way that output power of the fuel cell 20 matches target power. More specifically, the control unit 50 controls the oxidant gas supply by controlling the RPM of the motor M1 which drives the air compressor 40 and controls the fuel gas supply by controlling the RPM of the motor M2 which drives the hydrogen pump 63. Furthermore, the control unit 50 adjusts operating points (output voltage and output current) of the fuel cell 20 by controlling the DC-DC converter 53 to achieve the output power of the fuel cell 20 that matches the target power.

The fuel gas supply system includes four sections: a high-pressure section (section from the tank valve H201 to the hydrogen supply valve H200); a low-pressure section (section from the hydrogen supply valve H200 to the FC inlet valve H21); an FC section (section from the stack inlet valve H21 to the FC outlet valve H22); and a circulating section (section from the FC outlet valve H22 to the return check valve H52), with pressure sensors P6, P7, P9, P61, P5, P10, and P11 for detecting the pressure of the fuel gas being arranged in the sections. More specifically, the pressure sensor P6 detects the supply pressure of the fuel gas of the fuel gas supply source 30. The pressure sensor P7 detects the secondary pressure of the high pressure regulator H9. The pressure sensor P9 detects the secondary pressure of the low pressure regulator H10. The pressure sensor P61 detects the pressure of the low-pressure section of the fuel gas supply passage 31. The pressure sensor P5 detects the pressure of the stack inlet. The pressure sensor P10 detects the pressure on the input port side (upstream side) of the hydrogen circulating pump 63. The pressure sensor P11 detects the pressure on the output port side (downstream side) of the hydrogen circulating pump 63. In addition, a temperature sensor T31 for detecting a fuel gas temperature (or a stack temperature) is provided in the fuel gas circulating passage 32 in the vicinity of an anode outlet. A temperature sensor T2 for detecting a coolant temperature (or a stack temperature) is provided in the cooling channel 71 in the vicinity of a coolant outlet of the fuel cell 20.

In this embodiment, the failure detection and judgment processing of reaction gas is performed for each section of a reaction gas passage. It should be noted here that the reaction gas passage is a generic name given to the fuel gas supply system and the oxidant gas supply system. In addition, the failure judgment is to determine whether there is a gas leak from the reaction gas passage (an open failure of a valve provided in the gas passage, a leakage from the gas passage, or the like) or clogging of the reaction gas passage (a valve closed failure or the existence of foreign matter (generated water or the like)). The open failure means a failure state in which the valve cannot be closed with the valve open and the closed failure means a failure state in which the valve cannot be opened with the valve closed. The reaction gas passage to be a failure detection portion can be one or both of the fuel gas supply system and the oxidant gas supply system. More specifically, the reaction gas passage to be a failure detection portion can be one of the fuel gas supply passage 31, the fuel gas circulating passage 32, the anode off-gas passage 33, the oxidant gas supply passage 41, and the cathode off-gas passage 42 or a part of one of the gas passages.

For example, when performing the failure detection and judgment of the fuel gas supply system, it is preferable to divide the fuel gas supply system into a plurality of sections (the high-pressure section, the low-pressure section, the FC section, and the circulating section) and to perform the failure detection and judgment for each section. Each section is to be a failure detection portion. The control unit 50 functions as a judgment unit (judgment means) for performing failure detection and judgment (for example, gas leak judgment (S102, S106, and S109)) described later and also functions as a control unit (control means) which controls auxiliary devices (S107) to accelerate the consumption of the fuel gas by increasing the electric power consumption of the auxiliary devices when the electric power generation of the fuel cell 20 and the electric power consumption of the auxiliary devices result in an insufficient consumption of the fuel gas. More specifically, the control unit 50 consumes electric power generated by the fuel cell 20 by means of the auxiliary devices preferentially and surplus power that cannot be consumed by the auxiliary devices is supplied to the secondary battery 54. If the electric power generation of the fuel cell 20 exceeds the total sum of the chargeable power of the secondary battery 54 and the auxiliary loss (the electric power consumption of the auxiliary devices), the surplus power is consumed by increasing the auxiliary loss. Thereby, the fuel gas in the fuel gas supply passage 31 and the fuel gas circulating passage 32 can be consumed as much as possible, by which the pressure at the gas leak detection portion can be rapidly brought close to the target pressure. To increase the auxiliary loss, for example, the drive load of the hydrogen pump 63 or the air compressor 40 is increased or the drive load of the auxiliary devices in the cooling system is increased as described later, or else the frequency of the auxiliary inverter 52 is adjusted in such a way that the power conversion efficiency deteriorates (the heat loss increases). Since the degree to which the auxiliary loss should be adjusted to consume the surplus power relates to the state of charge (SOC) of the secondary battery 54, it is preferable to adjust the auxiliary loss while monitoring the SOC of the secondary battery 54.

Figure 2:
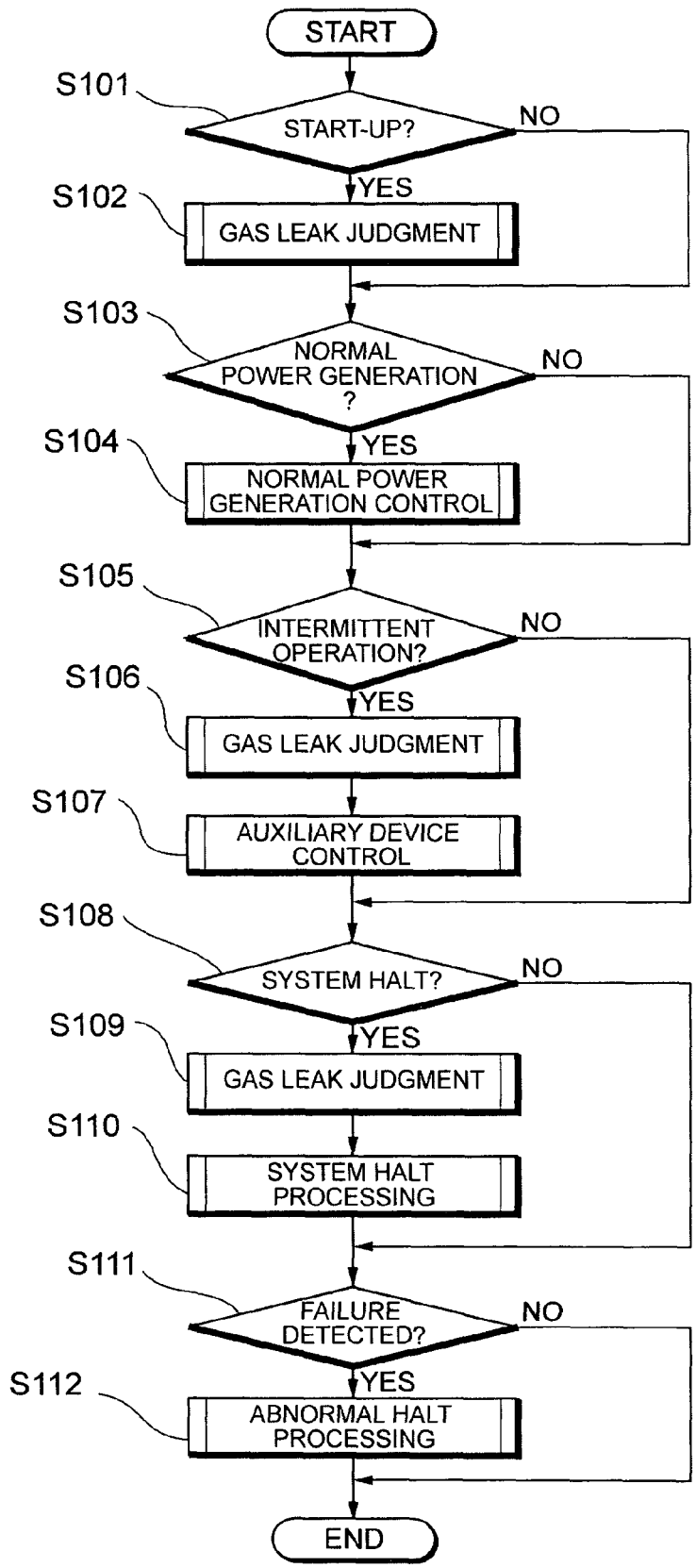
FIG. 2 is a main routine for system control.

Referring to FIG. 2, there is shown a main routine including the system control performed by the control unit 50. The outline of the system control will now be described with reference to FIG. 2 before describing the subroutines. Upon start-up of the fuel cell system 10 (S101: YES), the control unit 50 performs a gas leak judgment of the fuel gas supply system (S102). If the control unit 50 determines that there is no gas leak and that electric power can be normally generated (S103: YES), a normal electric power generation control is performed (S104). If the normal operation is continued in this manner and a predetermined intermittent operation start condition is satisfied (S105: YES), the control unit 50 performs the gas leak judgment of the fuel gas supply system (S106). The intermittent operation means an operation mode in which the electric power generation of the fuel cell 20 is temporarily stopped during a low load operation such as idling, low-speed driving, or regenerative braking and the electric power supplied from the secondary battery 54 is used for driving. When the electric power generation of the fuel cell 20 and the electric power consumption of the auxiliary devices result in an insufficient consumption of the fuel gas, the auxiliary devices are controlled to increase the electric power consumption of the auxiliary devices (S107). If the system halts (S108: YES), the control unit 50 performs a gas leak judgment of the fuel gas supply system (S109) and performs the system halt processing (S110). If a gas leak is detected (S111: YES), the control unit 50 performs abnormal halt processing (S112).

Subsequently, the subroutines will be described below.

Figure 3:
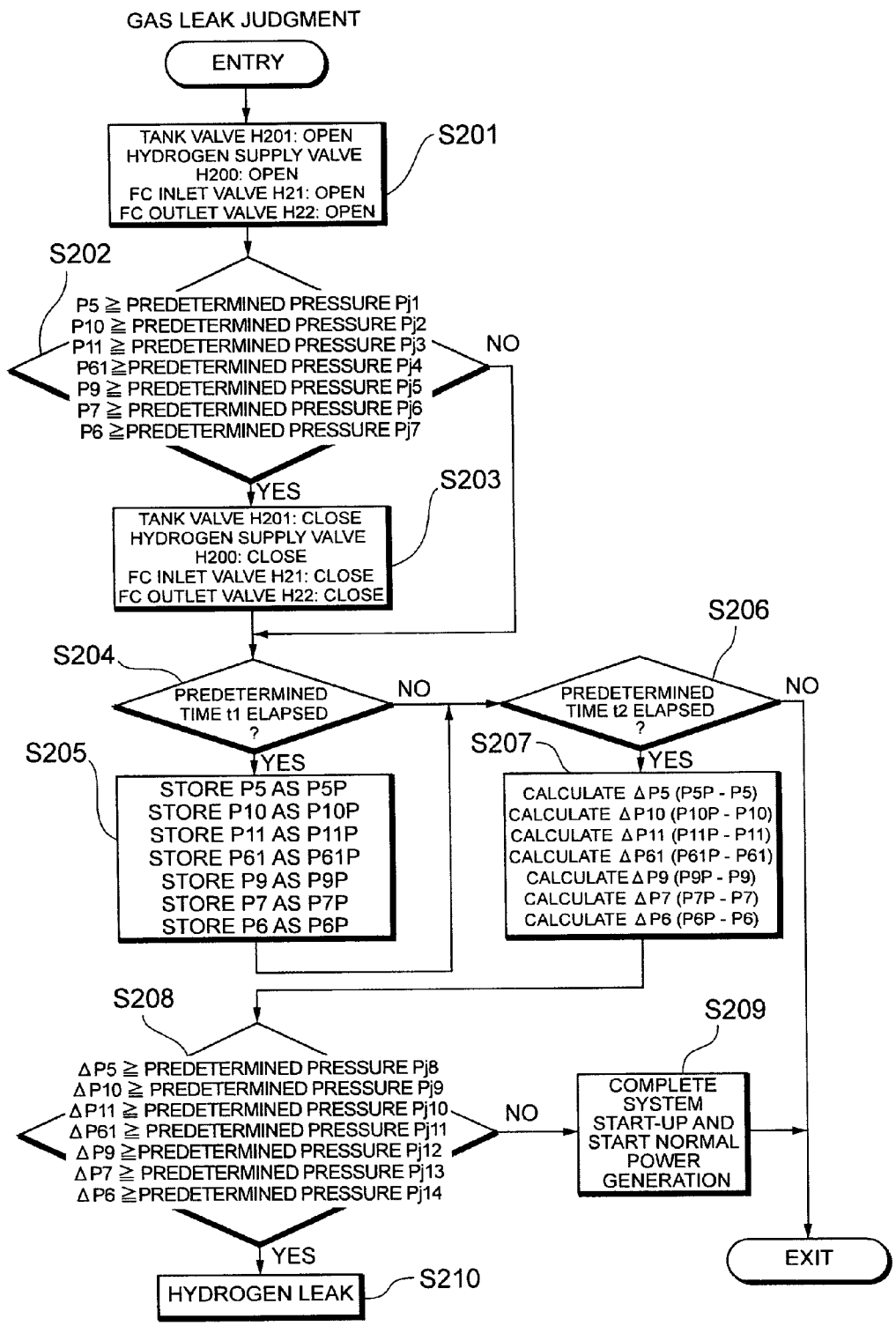
FIG. 3 is a gas leak judgment routine executed at the system start-up time.

Referring to FIG. 3, there is shown a flowchart of a gas leak judgment routine (S102) executed upon the system start-up. After the routine is called, the control unit 50 opens the tank valve H201, the hydrogen supply valve H200, the FC inlet valve H21, and the FC outlet valve H22 to supply the fuel gas to the fuel cell 20 through the fuel gas supply passage 31 (S201). Subsequently, the control unit 50 determines whether the pressure values of all the pressure sensors P5 to P6 arranged in the fuel gas supply system are equal to or higher than predetermined pressure values Pj1 to Pj7, respectively (S202). When all the pressure sensors P5 to P6 reach the predetermined pressure values Pj1 to Pj7 or higher, respectively, and the pressures of the fuel gas supply passage 31 and the fuel gas circulating passage 32 increase up to the levels where the gas leak judgment can be performed (S202: YES), the control unit 50 closes the tank valve H201, the hydrogen supply valve H200, the FC inlet valve H21, and the FC outlet valve H22 (S203) to seal the fuel gas supply passage 31 and the fuel gas circulating passage 32. Then, after an elapse of predetermined time t1 from the start of the sealing (S204), the control unit 50 stores the pressure values of the pressure sensors P5 to P6 as P5P to P6P (S205). Furthermore, after an elapse of predetermined time t2 from the start of the sealing (S206), the control unit 50 calculates differential pressures as to DP6 between the stored pressure values P5P to P6P and the pressure values detected by the pressure sensors P5 to P6 at the time point when the predetermined time t2 has elapsed (S207). The differential pressures $\Delta P5$ to $\Delta P6$ obtained here are equivalent to the amounts of pressure drop over time (t2−t1). The control unit 50 determines whether the differential pressures $\Delta P5$ to $\Delta P6$ are equal to or higher than predetermined pressure values pj8 to Pj14 (S208). If all of the differential pressures $\Delta P5$ to $\Delta P6$ are lower than the predetermined pressure values pj8 to Pj14 (S208: NO), it is considered that there is no gas leak and therefore the control unit 50 completes the system start-up and starts the normal electric power generation (S209). On the other hand, if at least one of the differential pressures $\Delta P5$ to $\Delta P6$ are equal to or higher than the corresponding predetermined pressure values of pj8 to Pj14 (S208: YES), the control unit 50 determines that there is a gas leak (S209).

Figure 4:
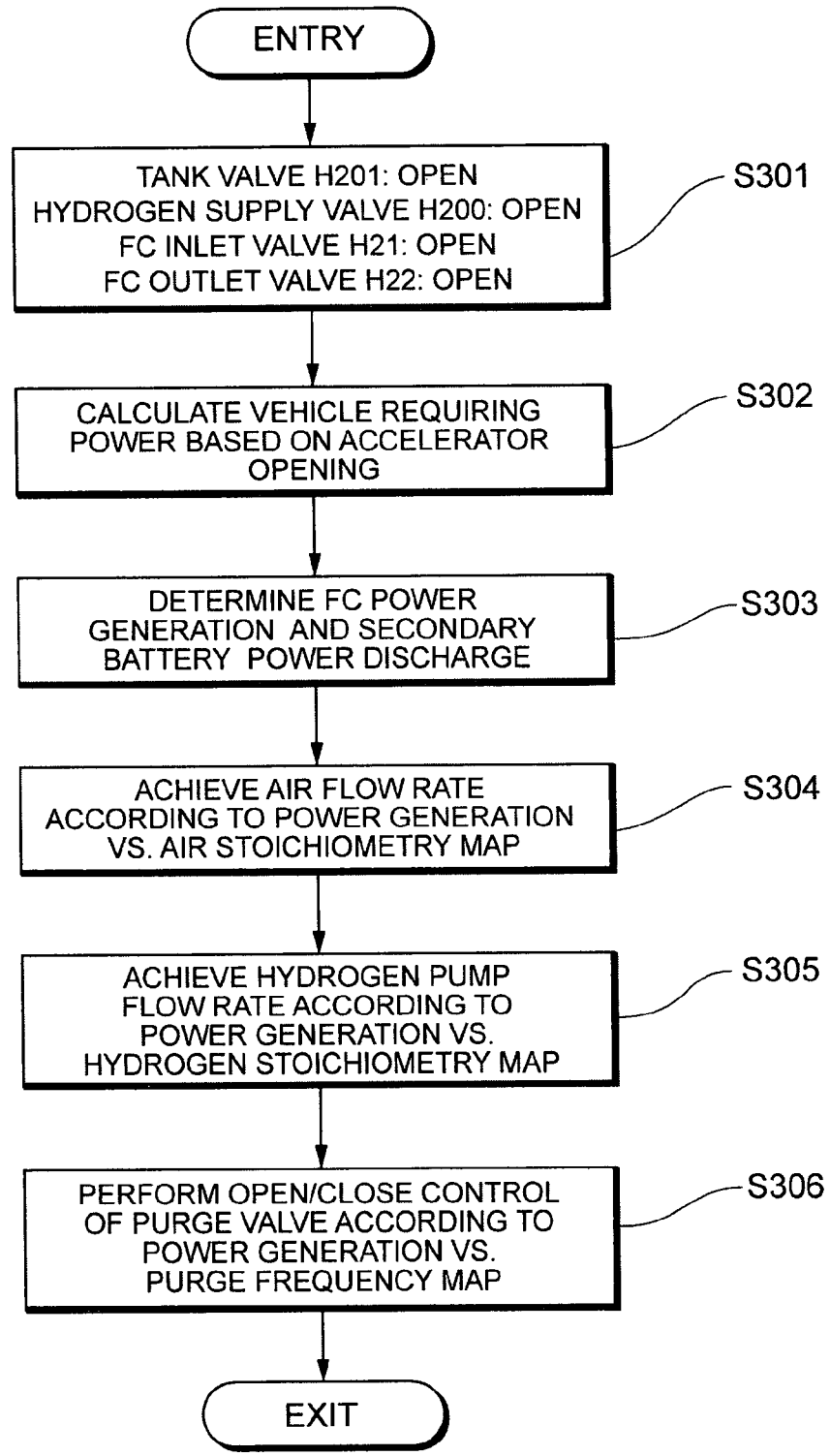
FIG. 4 is a normal electric power generation control routine.
Figure 5:
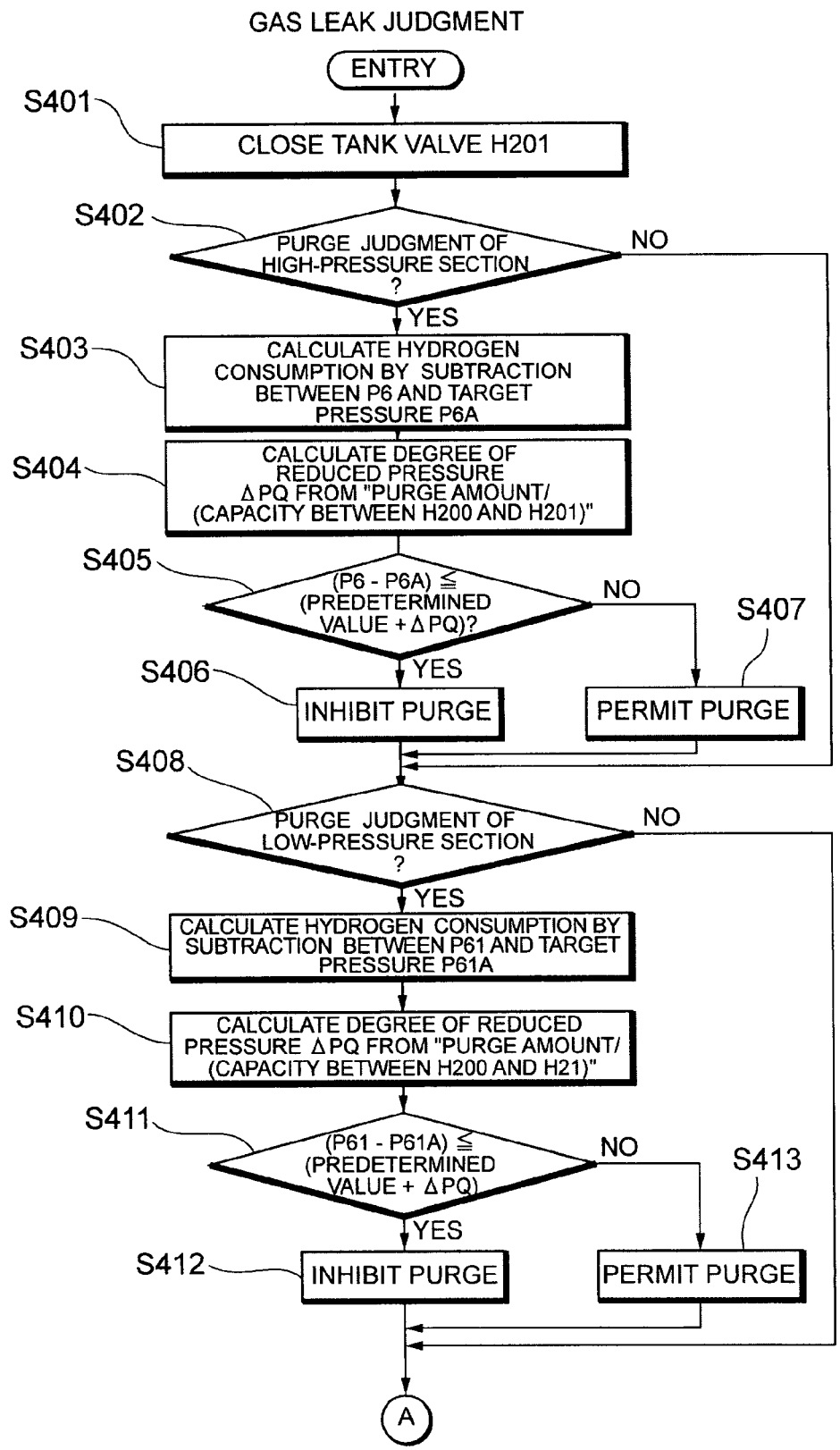
FIG. 5 is a gas leak judgment routine.
Figure 6:
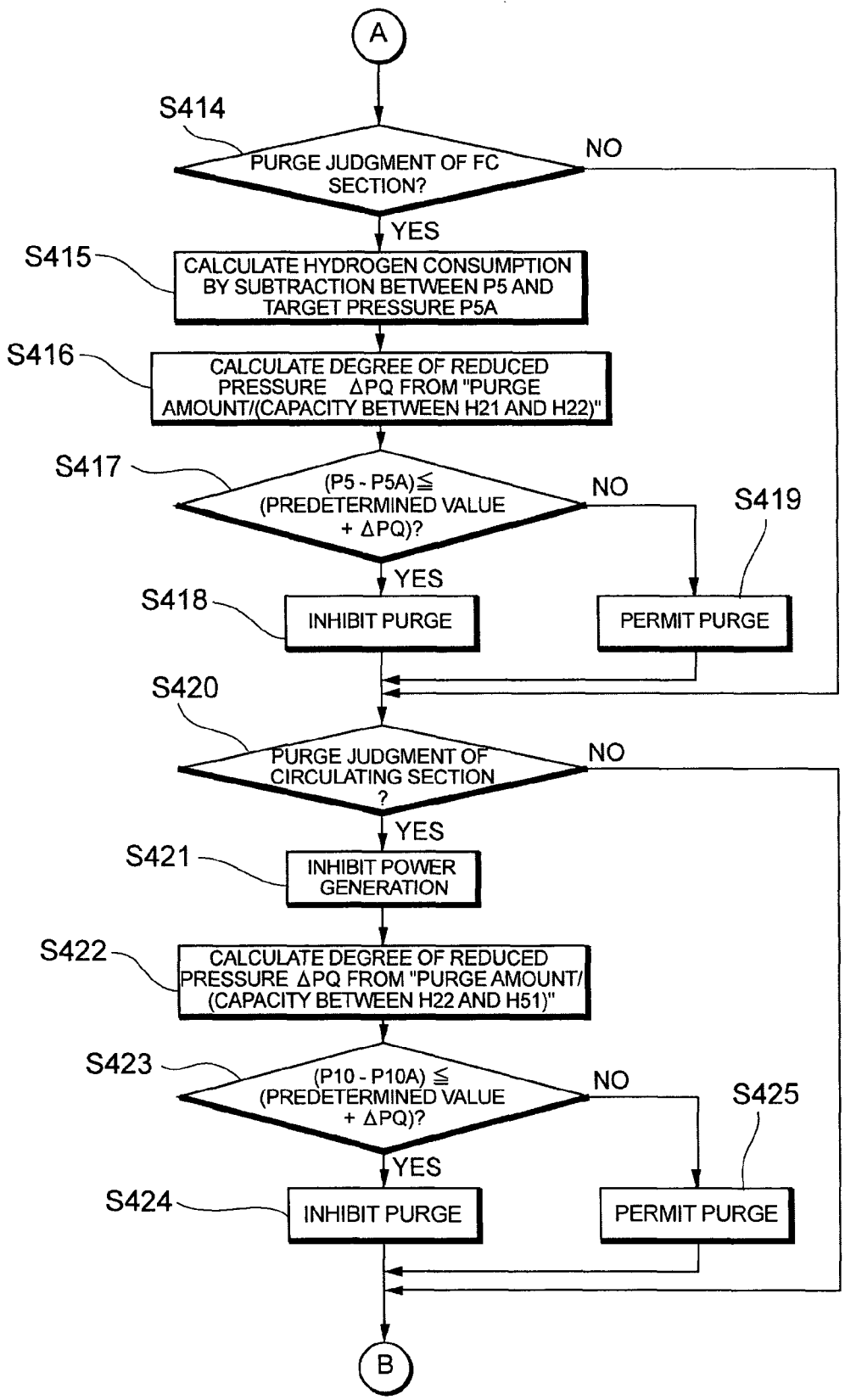
FIG. 6 is a gas leak judgment routine.
Figure 7:
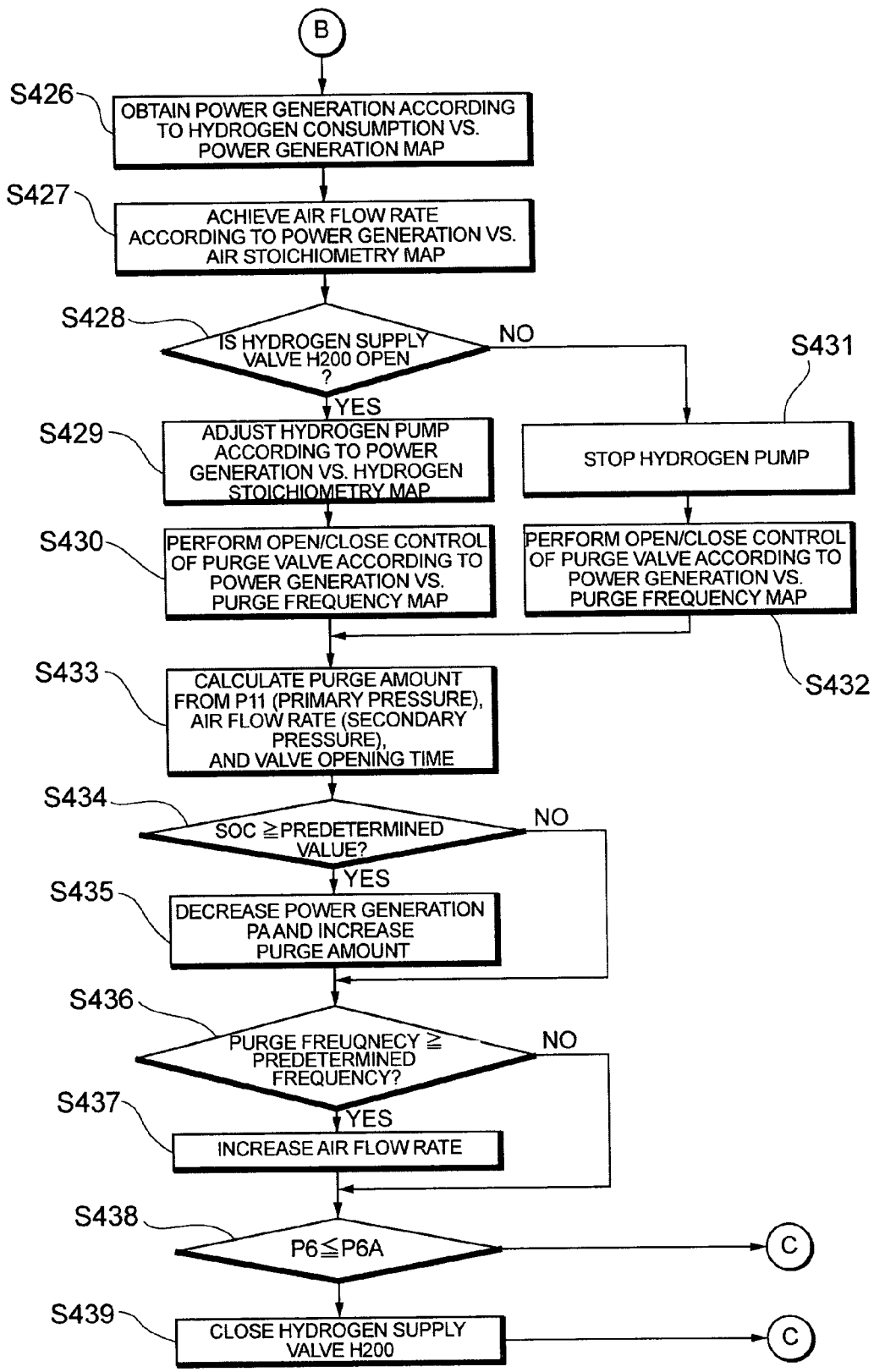
FIG. 7 is a gas leak judgment routine.
Figure 8:
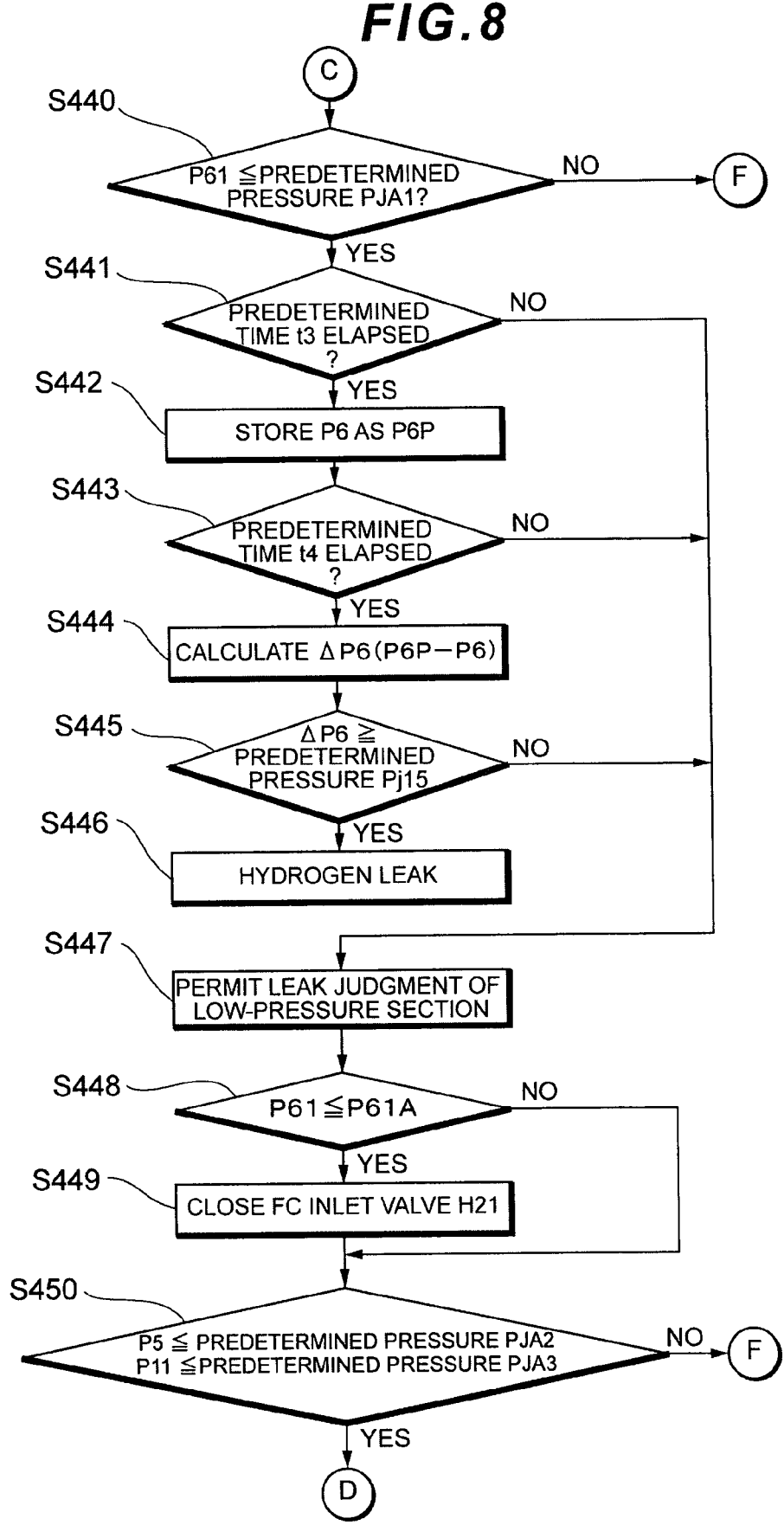
FIG. 8 is a gas leak judgment routine.
Figure 9:
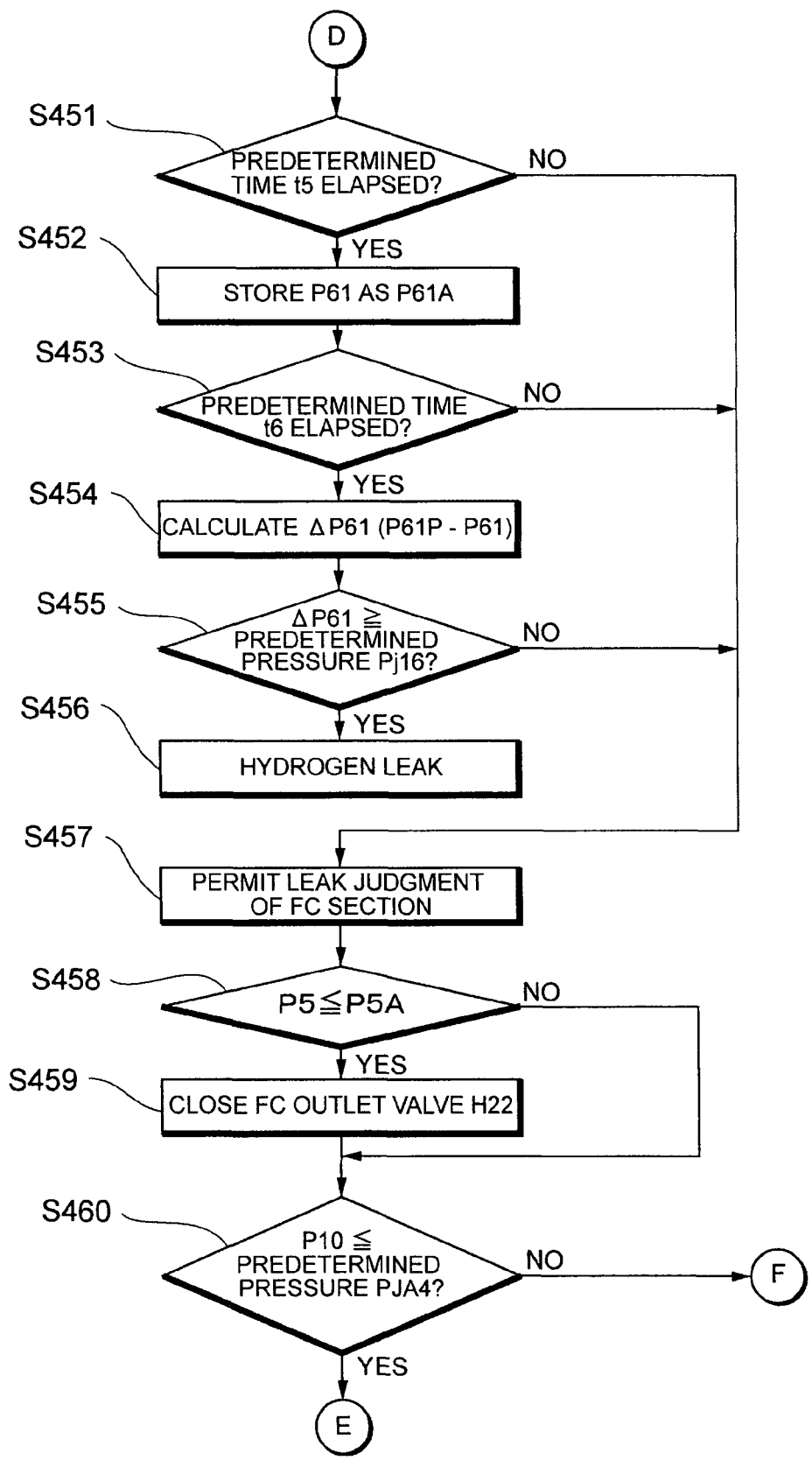
FIG. 9 is a gas leak judgment routine.
Figure 10:
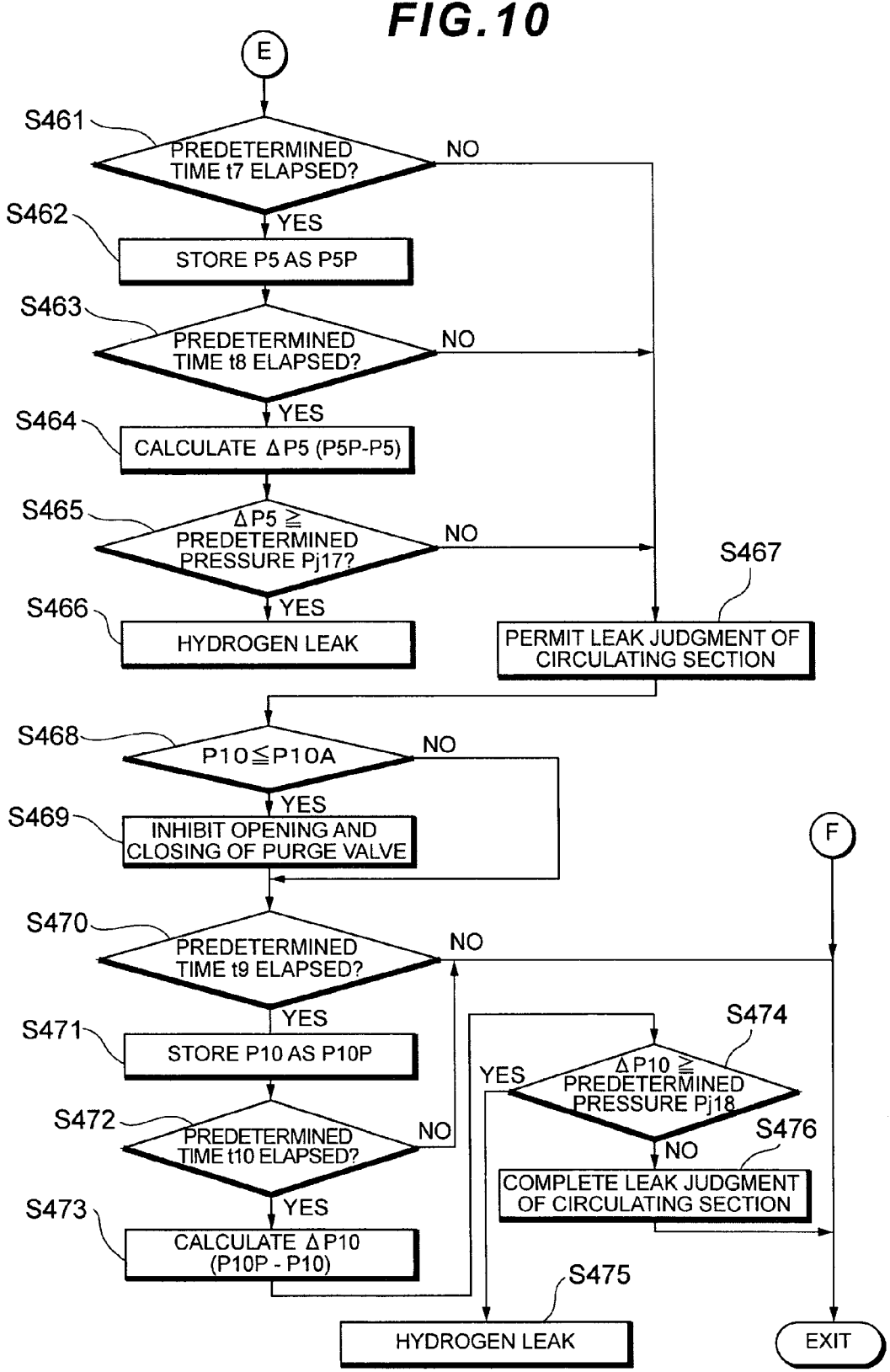
FIG. 10 is a gas leak judgment routine.

Referring to FIG. 4, there is shown a flowchart including an electric power generation control routine (S104) during the normal operation. After the electric power generation control routine is called, the control unit 50 opens the valves in the fuel gas supply system (the tank valve H201, the hydrogen supply valve H200, the FC inlet valve H21, and the FC outlet valve H22) (S301). Subsequently, the control unit 50 calculates vehicle requiring power (system requiring power) on the basis of the accelerator opening, the vehicle speed, and the like (S302) and determines a ratio between the output power of the fuel cell 20 and the output power of the secondary battery 54 (S303). The control unit 50 controls the RPM of the motor M1 in such a way that a desired flow rate of the oxidant gas is supplied to the fuel cell 20 with reference to a "fuel cell electric power generation vs. air stoichiometry" map (two-dimensional map)(S304). Furthermore, the control unit 50 controls the RPM of the motor M2 in such a way that a desired flow rate of oxidant gas is supplied to the fuel cell 20 with reference to the "fuel cell electric power generation vs. hydrogen stoichiometry" map (S305). Subsequently, the control unit 50 performs the open/close control of the purge valve H51 with reference to a "fuel cell electric power generation vs. fuel gas purge frequency" map (S306). Thereafter, the normal operation is continuously performed by repeating this electric power generation control routine at predetermined intervals.

Referring to FIG. 5 to FIG. 10, there are shown flowcharts of the gas leak judgment routine during intermittent operation or system halt (S106, S108). After the gas leak judgment routine is called, the control unit 50 closes the tank valve H201 (S401) and makes a purge judgment of the high-pressure section (S402). The purge judgment is to determine whether the fuel gas should be purged. First, the control unit 50 calculates a required amount of fuel gas consumption to make the pressure of the high-pressure section match the target pressure P6A on the basis of the differential pressure between the pressure detected by the pressure sensor P6 and the target pressure P6A of the high-pressure section (S403). Subsequently, the control unit 50 calculates a degree of reduced pressure $\Delta PQ$ from a ratio between a purge amount per one time of the purge valve H51 and the capacity of the high-pressure section (S404). If the differential pressure between the pressure of the high-pressure section and the target pressure P6A is equal to or lower than a value of "ΔPQ+a predetermined value (margin)" (S405: YES), the pressure of the high-pressure section drops lower than the target pressure P6A when the fuel gas is purged, and therefore the control unit 50 inhibits the purge (S406). On the other hand, if the differential pressure between the pressure of the high-pressure section and the target pressure P6A exceeds the value of "ΔPQ+the predetermined value (margin)" (S405: NO), the pressure of the high-pressure section does not drop lower than the target pressure P6A when the fuel gas is purged and therefore the control unit 50 permits the purge (S407).

Subsequently, the control unit 50 makes a purge judgment of the low-pressure section (S408). First, it calculates a required amount of fuel gas consumption to make the pressure of the low-pressure section match the target pressure P61A on the basis of the differential pressure between the pressure detected by the pressure sensor P61 and the target pressure P61A of the high-pressure section (S409). The control unit 50 then calculates a degree of reduced pressure ΔPQ from a ratio between a purge amount per one time of the purge valve H51 and the capacity of the low-pressure section (S410). If the differential pressure between the pressure of the low-pressure section and the target pressure P61A is equal to or lower than a value of "ΔPQ+a predetermined value (margin)" (S411: YES), the pressure of the low-pressure section drops lower than the target pressure P61A when the fuel gas is purged, and therefore the control unit 50 inhibits the purge (S412). On the other hand, if the differential pressure between the pressure of the low-pressure section and the target pressure P61A exceeds the value of "ΔPQ+the predetermined value (margin)" (S411: NO), the pressure of the low-pressure section does not drop lower than the target pressure P61A when the fuel gas is purged and therefore the control unit 50 permits the purge (S413).

Subsequently, the control unit 50 makes a purge judgment of the FC section (S414). First, it calculates a required amount of fuel gas consumption to make the pressure of the FC section match the target pressure P5A on the basis of the differential pressure between the pressure detected by the pressure sensor P5 and the target pressure P5A of the high-pressure section (S415). The control unit 50 then calculates a degree of reduced pressure ΔPQ from a ratio between a purge amount per one time of the purge valve H51 and the capacity of the FC section (S416). If the differential pressure between the pressure of the FC section and the target pressure P5A is equal to or lower than a value of "ΔPQ+a predetermined value (margin)" (S417: YES), the pressure of the FC section drops lower than the target pressure P5A when the fuel gas is purged, and therefore the control unit 50 inhibits the purge (S418). On the other hand, if the differential pressure between the pressure of the FC section and the target pressure P5A exceeds the value of "ΔPQ+the predetermined value (margin)" (S417: NO), the pressure of the FC section does not drop lower than the target pressure P5A when the fuel gas is purged and therefore the control unit 50 permits the purge (S419).

Subsequently, the control unit 50 makes a purge judgment of the circulating section (S420). First, it inhibits electric power generation (S421). Then, the control unit 50 calculates a degree of reduced pressure ΔPQ from a ratio between a purge amount per one time of the purge valve H51 and the capacity of the circulating section (S422). If the differential pressure between the pressure of the circulating section and the target pressure P10A is equal to or lower than a value of "ΔPQ+a predetermined value (margin)" (S423: YES), the pressure of the circulating section drops lower than the target pressure P10A when the fuel gas is purged, and therefore the control unit 50 inhibits the purge (S424). On the other hand, if the differential pressure between the pressure of the circulating section and the target pressure P10A exceeds the value of "ΔPQ+the predetermined value (margin)" (S423: NO), the pressure of the circulating section does not drop lower than the target pressure P10A when the fuel gas is purged and therefore the control unit 50 permits the purge (S425).

Upon completion of the purge judgment of these sections, the control unit 50 obtains the electric power generation of the fuel cell 20 for consuming the fuel gas calculated in steps S403, S409, and S415 with reference to a "hydrogen consumption vs. fuel cell electric power generation" map (S426). Furthermore, it adjusts the RPM of the motor M1 in such a way that oxidant gas necessary to obtain the desired electric power generation is supplied to the fuel cell 20 with reference to the "fuel cell electric power generation vs. air stoichiometry" map (S427). If the hydrogen supply valve H200 is open (S428: YES), the control unit 50 adjusts the RPM of the motor M2 in such a way that a required flow rate of fuel gas to achieve the desired electric power generation is supplied to the fuel cell 20 with reference to a "fuel cell electric power generation vs. hydrogen stoichiometry" map (S429). Furthermore, the control unit 50 performs the open/close control of the purge valve H51 with reference to a "fuel cell electric power generation vs. purge frequency" map (S430). If purge is inhibited in this situation (S406, S412, S418, and S424), the purge valve H51 remains closed. On the other hand, if the hydrogen supply valve H200 is closed (S428: NO), the control unit 50 stops the hydrogen pump 63 (S431) and performs the open/close control of the purge valve H51 with reference to the "fuel cell electric power generation vs. purge frequency" map (S432). When opening or closing the purge valve H51, the control unit 50 calculates a purge amount per one time on the basis of the primary pressure, the secondary pressure, and the valve opening time of the purge valve H51 (S433). The primary pressure of the purge valve H51 can be calculated from a pressure value detected by the pressure sensor P11. The secondary pressure of the purge valve H51 can be calculated from a flow rate of the oxidant off-gas flowing through the cathode off-gas passage 42.

If the SOC of the secondary battery 54 is equal to or higher than a predetermined value (for example, 80% to 90%) (S434: YES), the control unit 50 cannot store the electric power generated by the consumption of the fuel gas in the secondary battery 54 and therefore decreases the electric power generation of the fuel cell 20 and increases the purge amount of the fuel gas (S435). If the purge frequency of the fuel gas exceeds a predetermined frequency (S436: YES), the concentration of fuel gas vented to the outside of the system becomes higher. Therefore, the control unit 50 increases the RPM of the air compressor 40 in order to decrease the concentration of the vented fuel gas, thereby increasing the flow rate of the oxidant off-gas flowing through the cathode off-gas passage 42 and decreasing the concentration of the vented fuel gas to be diluted by the diluter 64 (S437).

The fuel gas consumption by the electric power generation and the fuel gas purge operation are performed in this manner (S426 to S437), thereby enabling a rapid reduction in the pressures of the sections (gas leak detection portions) in the fuel gas supply system. More specifically, the pressures of the high-pressure section, the low-pressure section, and the FC section can be decreased by the fuel gas consumption by the electric power generation and the purge operation of the fuel gas, and the pressure of the circulating section can be decreased by the purge operation of the fuel gas. The gas leak judgment of each of these sections is performed, for example, by closing the valves arranged in the fuel gas supply system to form a closed space (or substantially enclosed space) and detecting a pressure drop of the closed space.

If a pressure detected by the pressure sensor P6 is equal to or lower than the target pressure P6A (S438: YES), it indicates that the pressure of the high-pressure section has reached a preferable pressure for the gas leak judgment and therefore the control unit 50 closes the hydrogen supply valve H200 (S439). Thereby, the high-pressure section is sealed. Subsequently, the control unit 50 determines whether the pressure detected by the pressure sensor P61 provided in the downstream of the hydrogen supply valve H200 drops to a level equal to or lower than a predetermined pressure PJA1 (S440). The predetermined pressure PJA1 is a pressure for use in determining whether the hydrogen supply valve H200 is surely closed. If the pressure detected by the pressure sensor P61 is equal to ore lower than the predetermined pressure PJA1 (S440: YES), the control unit 50 determines whether predetermined time t3 has elapsed after the hydrogen supply valve H200 is closed in order to perform the gas leak judgment of the high-pressure section (S441). If the predetermined time t3 has elapsed (S441: YES), the control unit 50 stores the pressure detected by the pressure sensor P6 as P6P (S442). Furthermore, the control unit 50 determines whether predetermined time t4 has elapsed after the hydrogen supply valve H200 is closed (S443). If the predetermined time t4 has elapsed (S443: YES), the control unit 50 calculates a differential pressure (pressure drop) DP6 between the stored pressure P6P and the pressure detected by the pressure sensor P6 (S444). If the differential pressure DP6 is equal to or higher than a predetermined threshold pressure Pj15 (S445: YES), the control unit 50 determines that there is a gas leak in the high-pressure section (S446). A possible cause of the gas leak is an open failure of the tank valve H201 or the hydrogen supply valve H22 or a breakage of the regulator H9 or H10 or of the fuel gas supply passage 31.

On the other hand, unless the predetermined time t3 (S441: NO) or the predetermined time t4 (S443: NO) has elapsed after the hydrogen supply valve H200 is closed or if the differential pressure ΔP6 is less than the predetermined threshold pressure Pj15 (S445: NO), the control unit 50 permits the gas leak judgment of the low-pressure section (S447). This is because the gas leak judgment of the low-pressure section can be made in parallel with the gas leak judgment of the high-pressure section as long as the hydrogen supply valve H200 has already been closed even if the predetermined time t3 or t4 has not elapsed after the hydrogen supply valve H200 is closed.

If the pressure detected by the pressure sensor P61 is equal to or lower than the target pressure P61A (S448: YES), it means that the pressure of the low-pressure section has reached a preferable pressure for the gas leak judgment. Therefore, the control unit 50 closes the FC inlet valve H21 (S449). Thereby, the low-pressure section is sealed. Subsequently, the control unit 50 determines whether the pressures detected by the pressure sensors P5 and P11 provided in the downstream of the FC inlet valve H21 drop to levels equal to or lower than predetermined pressures PJA2 and PJA3, respectively (S450). The predetermined pressures PJA2 and PJA3 are for use in determining whether the FC inlet valve H21 is surely closed. If the pressures detected by the pressure sensors P5 and P11 drop to the levels equal to or lower than the predetermined pressures PJA2 and PJA3, respectively (S450: YES), the control unit 50 determines whether predetermined time t5 has elapsed after the FC inlet valve H21 is closed in order to make the gas leak judgment of the low-pressure section (S451). If the predetermined time t5 has elapsed (S451: YES), the control unit 50 stores the pressure detected by the pressure sensor P61 as P61P (S452). Furthermore, the control unit 50 determines whether predetermined time t6 has elapsed after the FC inlet valve H21 is closed (S453). If the predetermined time t6 has elapsed (S453: YES), the control unit 50 calculates the differential pressure (pressure drop) DP61 between the stored pressure P61P and the pressure detected by the pressure sensor P61 (S454). If the differential pressure DP61 is equal to or higher than a predetermined threshold pressure Pj16 (S455: YES), the control unit 50 determines that there is a gas leak in the low-pressure section (S456). A possible cause of the gas leak is an open failure of the hydrogen supply valve H22 or the FC inlet valve 1121 or a breakage of the fuel gas supply passage 31 or the fuel gas circulating passage 32.

On the other hand, unless the predetermined time t5 (S451: NO) or the predetermined time t6 (S453: NO) has elapsed after the FC inlet valve H21 is closed or if the differential pressure ΔP61 is less than the predetermined threshold pressure Pj16 (S455: NO), the control unit 50 permits the gas leak judgment of the FC section (S457). This is because the gas leak judgment of the FC section can be made in parallel with the gas leak judgment of the low-pressure section as long as the FC inlet valve H21 has already been closed even if the predetermined time t5 or t6 has not elapsed after the FC inlet valve 1121 is closed.

If the pressure detected by the pressure sensor P5 is equal to or lower than the target pressure P5A (S458: YES), it means that the pressure of the FC section has reached a preferable pressure for the gas leak judgment. Therefore, the control unit 50 closes the FC outlet valve H22 (S459). Thereby, the FC section is sealed. Subsequently, the control unit 50 determines whether the pressures detected by the pressure sensor P10 provided in the downstream of the FC outlet valve H22 drops to a level equal to or lower than a predetermined pressure PJA4 (S460). The predetermined pressures PJA4 is for use in determining whether the FC outlet valve H22 is surely closed. If the pressure detected by the pressure sensor P10 drops to a level equal to or lower than the predetermined pressure PJA4 (S460: YES), the control unit 50 determines whether predetermined time t7 has elapsed after the FC outlet valve H22 is closed in order to make the gas leak judgment of the FC section (S461). If the predetermined time t7 has elapsed (S461: YES), the control unit 50 stores the pressure detected by the pressure sensor P5 as P5P (S462). Furthermore, the control unit 50 determines whether predetermined time t8 has elapsed after the FC outlet valve H22 is closed (S463). If the predetermined time t8 has elapsed (S463: YES), the control unit 50 calculates the differential pressure (pressure drop) ΔP5 between the stored pressure P5P and the pressure detected by the pressure sensor P5 (S464). If the differential pressure ΔP5 is equal to or higher than a predetermined threshold pressure Pj17 (S465: YES), the control unit 50 determines that there is a gas leak in the FC section (S466). A possible cause of the gas leak is an open failure of the FC inlet valve H21 or the FC outlet valve H22 or a breakage of the fuel gas supply passage 31 or the fuel gas circulating passage 32.

On the other hand, unless the predetermined time t7 (S461: NO) or the predetermined time t8 (S463: NO) has elapsed after the FC outlet valve H22 is closed or if the differential pressure ΔP5 is less than the predetermined threshold pressure Pj17 (S465: NO), the control unit 50 permits the gas leak judgment of the circulating section (S467). This is because the gas leak judgment of the circulating section can be made in parallel with the gas leak judgment of the FC section as long as the FC outlet valve H22 has already been closed even if the predetermined time t7 or t8 has not elapsed after the FC outlet valve H22 is closed.

If the pressure detected by the pressure sensor P10 is equal to or lower than the target pressure P10A (S468: YES), it means that the pressure of the circulating section has reached a preferable pressure for the gas leak judgment. Therefore, the control unit 50 inhibits the opening and closing of the purge valve H51 (S469). Thereby, the circulating section is sealed. In order to make the gas leak judgment of the circulating section, the control unit 50 determines whether predetermined time t9 has elapsed after the inhibition of the opening and closing of the purge valve H51 (or after the closing of the FC outlet valve H22) (S470). If the predetermined time t9 has elapsed (S470: YES), the control unit 50 stores the pressure detected by the pressure sensor P10 as P10P (S471). Furthermore, the control unit 50 determines whether predetermined time t10 has elapsed after the inhibition of the opening and closing of the purge valve H51 (or after the closing of the FC outlet valve H22) (S472). If the predetermined time t10 has elapsed (S472: YES), the control unit 50 calculates the differential pressure (pressure drop) ΔP10 between the stored pressure P10P and the pressure detected by the pressure sensor P10 (S473). If the differential pressure ΔP10 is equal to or higher than a predetermined threshold pressure Pj18 (S474: YES), the control unit 50 determines that there is a gas leak in the circulating section (S475). A possible cause of the gas leak is an open failure of the FC outlet valve H22 or the return check valve H52 or a breakage of the fuel gas circulating passage 32. On the other hand, if the pressure DP10 is less than a predetermined threshold pressure Pj18 (S474: NO), the control unit 50 determines that there is no gas leak in the circulating section and completes the gas leak judgment (S476).

Figure 11:
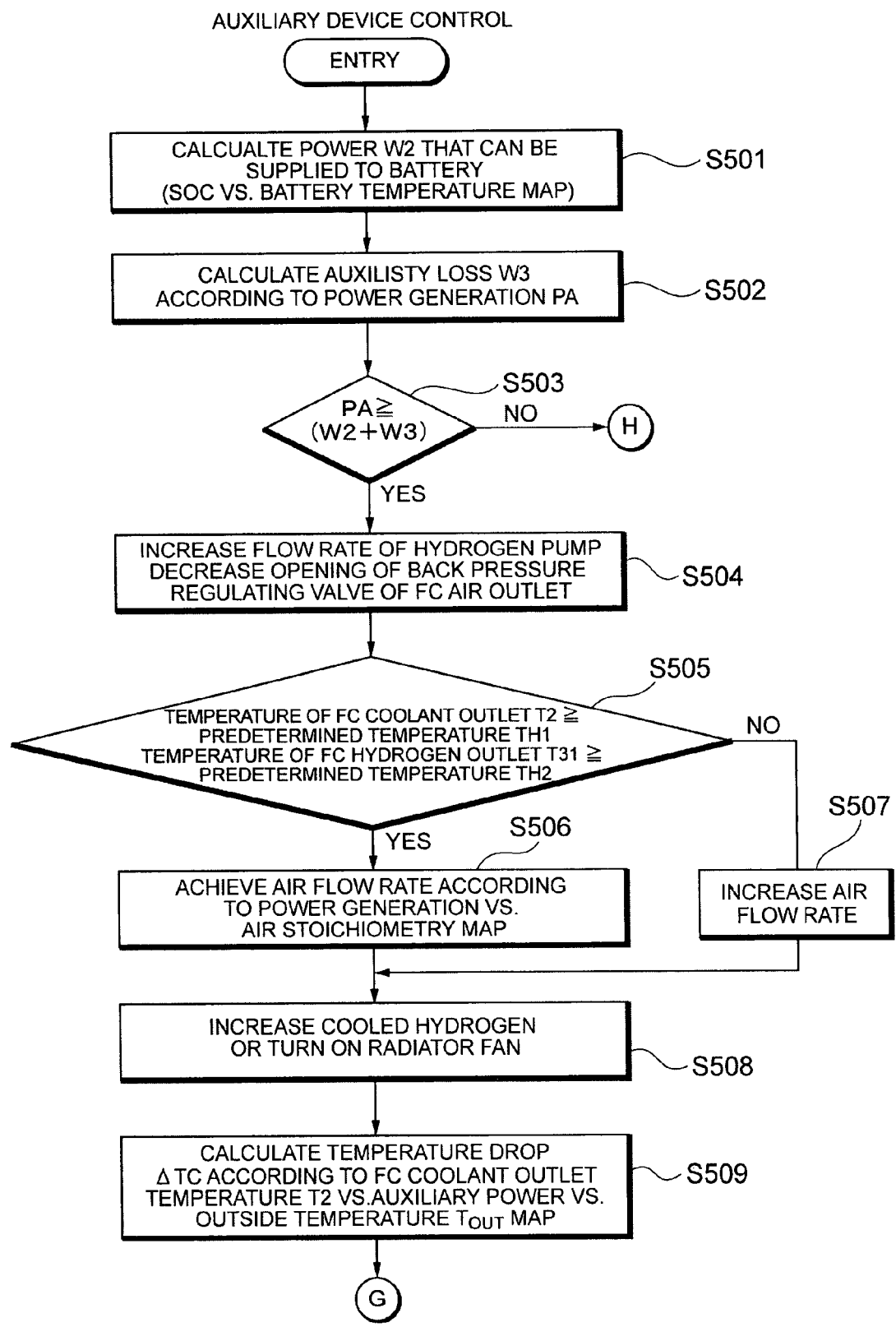
FIG. 11 is an auxiliary device control routine.
Figure 12:
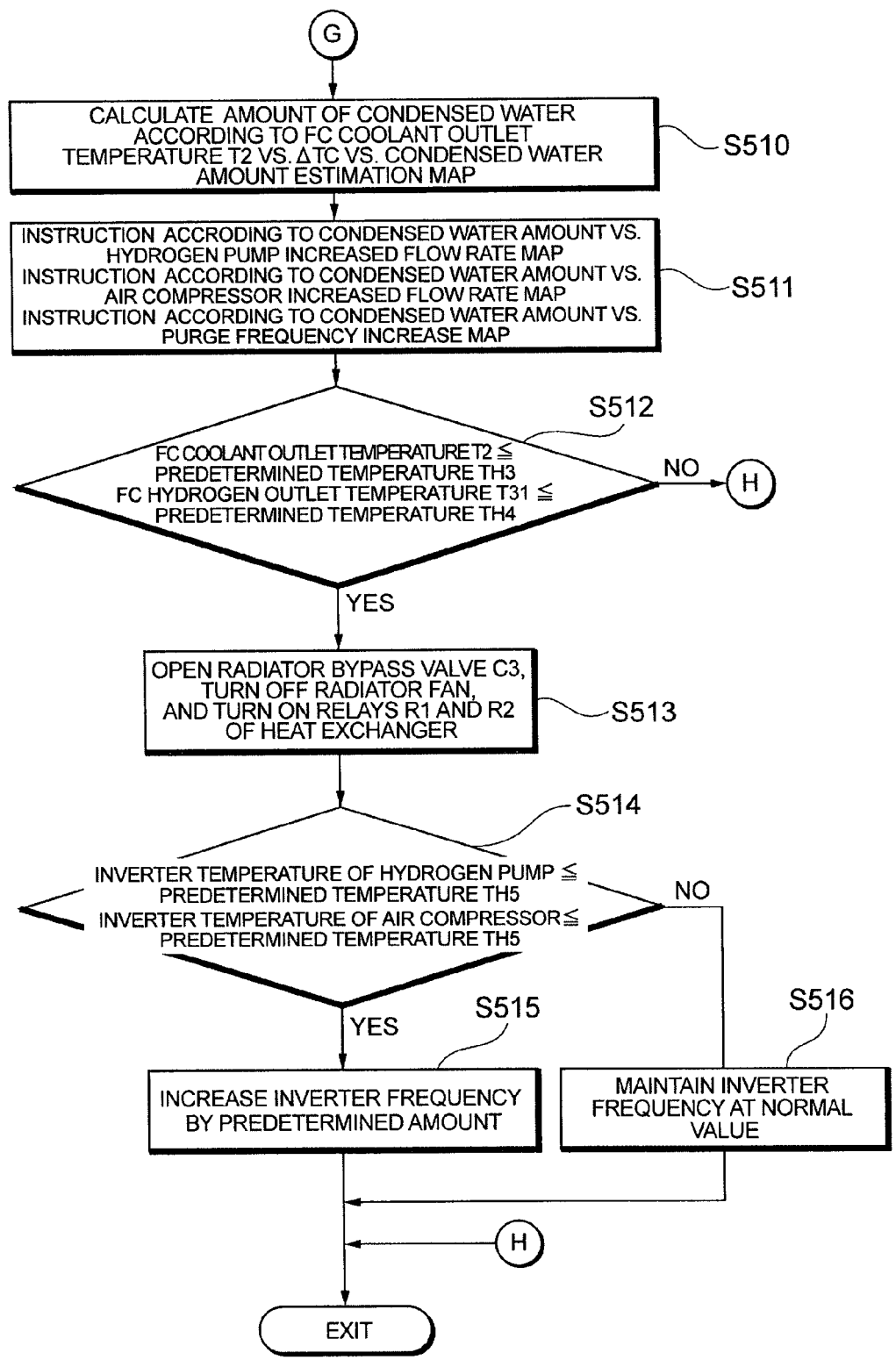
FIG. 12 is an auxiliary device control routine.

Referring to FIG. 11 and FIG. 12, there are shown flowcharts of an auxiliary device control routine (S107). After the auxiliary device control routine is called, the control unit 50 calculates electric power W2 that can be supplied to the secondary battery 54 with reference to an "SOC vs. battery temperature" map (S501). The lower the SOC is, the more the electric power can be supplied to the secondary battery 54. The lower or higher the battery temperature is, the less the electric power can be supplied to the secondary battery 54. Subsequently, the control unit 50 calculates an auxiliary loss W3 according to the electric power generation PA of the fuel cell 20 (S502). Then, the control unit 50 determines whether the electric power generation PA exceeds the total sum of the electric power W2 that can be supplied and the auxiliary loss W3 (S503). If the electric power generation PA exceeds the total sum of the electric power W2 that can be supplied and the auxiliary loss W3 (S503: YES), the electric power generation PA tends to be surplus. Therefore, the control unit 50 increases the drive load (electric power consumption) of the hydrogen pump 63 by increasing the flow rate of the hydrogen pump 63 or increases the drive load (electric power consumption) of the air compressor 40 by decreasing the valve opening of the pressure regulating valve A4 and increasing the fluid resistance of the cathode off-gas passage 42 (S504).

Subsequently, the control unit 50 detects the temperature condition of the fuel cell 20 and determines whether the temperature detected by the temperature sensor T2 is equal to or higher than a predetermined temperature TH1 or whether the temperature detected by the temperature sensor T31 is equal to or higher than a predetermined temperature TH2 (S505). The predetermined temperatures TH1 and TH2 are preferably set to temperatures at which the fuel cell 20 slightly dries up. If the temperature detected by the temperature sensor T2 is equal to or higher than the predetermined temperature TH1 or the temperature detected by the temperature sensor T31 is equal to or higher than the predetermined temperature TH2 (S505: YES), the control unit 50 adjusts the RPM of the air compressor 40 in such a way that the oxidant gas of the flow rate that does not dry up the fuel cell 20 is supplied to the fuel cell 20 with reference to the "fuel cell electric power generation vs. air stoichiometry" map (S506). On the other hand, if the temperature detected by the temperature sensor T2 is lower than the predetermined temperature TH1 and the temperature detected by the temperature sensor T31 is lower than the predetermined temperature TH2 (S505: NO), it is assumed that the fuel cell 20 does not dry up even if the flow rate of the oxidant gas supplied to the fuel cell 20 is increased. Therefore, the control unit 50 increases the RPM of the air compressor 40 to increase the drive load (electric power consumption) of the air compressor 40 (S507).

Subsequently, the control unit 50 increases the driving force (electric power consumption) of the circulating pump C1 to increase the flow rate of refrigerant or drives the radiator fan C13 to increase the auxiliary loss of the cooling system (S508). Thereby, a lot of surplus power can be consumed. On the other hand, however, the temperature of the fuel cell 20 may drop lower than the normal operating temperature. The control unit 50 calculates a temperature drop ΔTC of the fuel cell 20 with reference to an "FC coolant outlet temperature T2 vs. auxiliary power vs. outside temperature $T_{OUT}$" map (three-dimensional map) (S509). This three-dimensional map includes map data in which the temperature drop of the fuel cell 20 is previously obtained on the basis of the refrigerant temperature of the fuel cell 20, the drive load of the auxiliary coolers (the circulating pump C1 and the radiator fan C13), and the outside temperature $T_{OUT}$. Subsequently, the control unit 50 estimates the amount of condensed water generated inside the fuel cell 20 with reference to an "FC coolant outlet temperature T2 vs. ΔTC vs. condensed water amount estimation" map (S510). Since the anode side of the fuel cell 20 is assumed to be almost filled with saturated vapor, the amount of condensed water can be estimated to some extent from the temperature drop ΔTC. Subsequently, the control unit 50 increases the RPMs of the hydrogen pump 63 and the air compressor 40 according to the amount of condensed water with reference to a "condensed water amount vs. hydrogen pump increased flow rate" map, a "condensed water amount vs. air compressor increased flow rate" map, and a "condensed water amount vs. purge frequency increase" map. As the amount of condensed water increases, the cell voltage drops due to flooding more frequently, thereby increasing the supply of the fuel gas and the oxidant gas. In addition, the control unit 50 increases the purge frequency of the purge valve H51 to discharge the moisture included in the fuel gas as much as possible (S511).

Subsequently, the control unit 50 detects the temperature condition of the fuel cell 20 to determine whether the temperature detected by the temperature sensor T2 is equal to or lower than a predetermined temperature TH3 or whether the temperature detected by the temperature sensor T31 is equal to or lower than a predetermined temperature TH4 (S512). The predetermined temperatures TH3 and TH4 are preferably set to temperatures that cause the operating temperature of the fuel cell 20 to be substantially lower than the normal operating temperature. If the temperature detected by the temperature sensor T2 is equal to or lower than the predetermined temperature TH3 or the temperature detected by the temperature sensor T31 is equal to or lower than the predetermined temperature TH4 (S512: YES), the control unit 50 closes the bypass valve C3 and then turns off the radiator fan C13 and turns on the relays R1 and R2 in order to increase the refrigerant temperature (S513). Thereby, the refrigerant flows into the heat exchanger 70 bypassing the radiator C2 and is increased in temperature by the heat exchanger 70. The surplus electric power can be consumed efficiently by turning on the heater 70a.

Subsequently, the control unit 50 detects the temperature of the auxiliary inverter 52 and determines whether the inverter temperature of the hydrogen pump 63 or the inverter temperature of the air compressor 40 is equal to or lower than a predetermined temperature TH5 (S514). The predetermined temperature TH5 is preferably set to a temperature that causes the heat loss of the auxiliary inverter 52 to be excessive. If the inverter temperature of the hydrogen pump 63 or the inverter temperature of the air compressor 40 is equal to or lower than the predetermined temperature TH5 (S514: YES), it is assumed that the heat loss of the auxiliary inverter 52 is small. Therefore, the control unit 50 increases the heat loss by increasing the inverter frequency (S515). On the other hand, if the inverter temperature of the hydrogen pump 63 or the inverter temperature of the air compressor 40 is higher than the predetermined temperature TH5 (S514: NO), the control unit 50 maintains the inverter frequency at a normal value since the heat loss of the auxiliary inverter 52 is large (S516).

Figure 13:
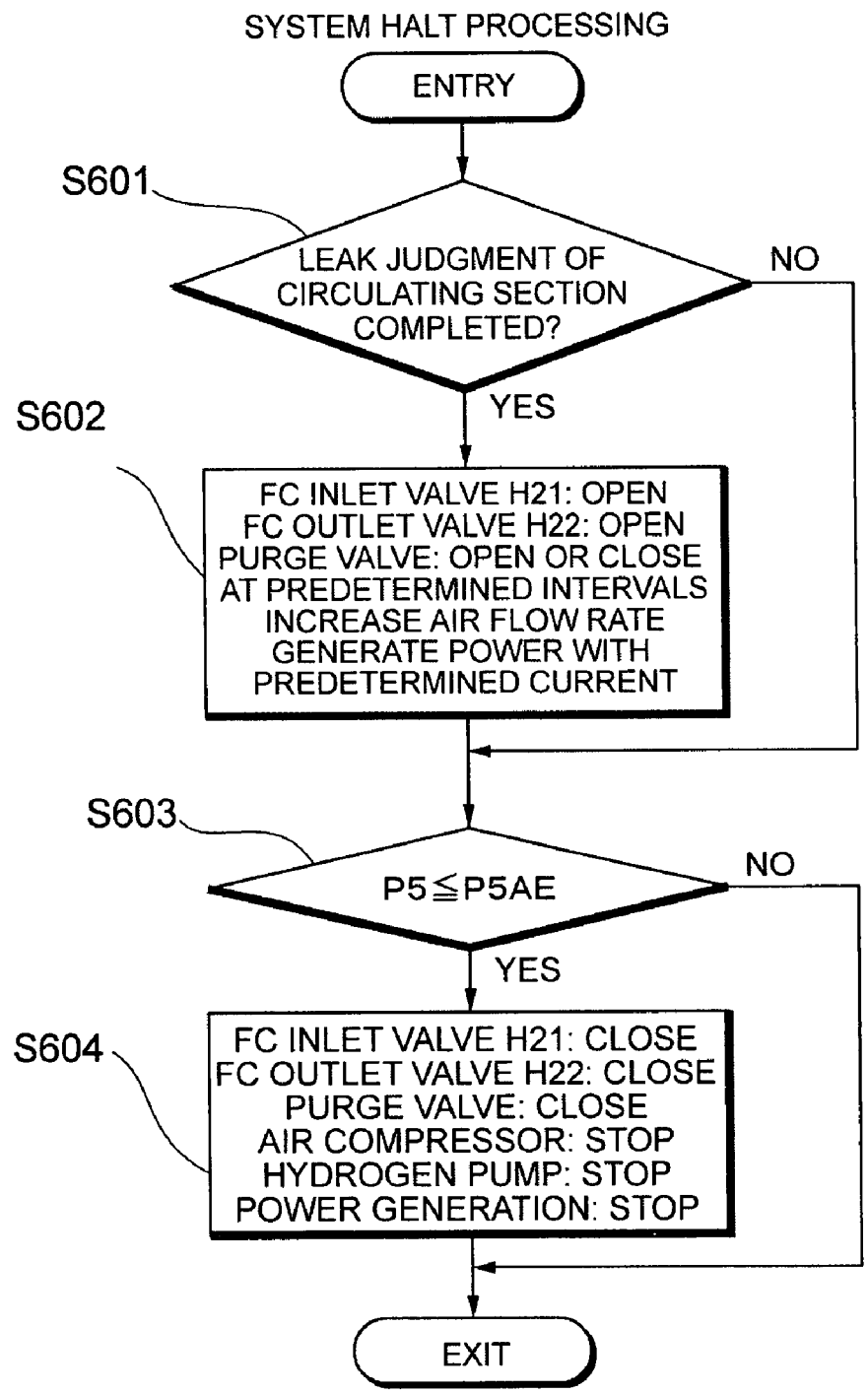
FIG. 13 is a system halt routine.

Referring to FIG. 13, there is shown a flowchart of a system halt routine (S110). After the system halt routine is called, the control unit 50 determines whether the gas leak judgment of the circulating section is completed (S601). If the gas leak judgment of the circulating section is completed (S601: YES), the control unit 50 opens the FC inlet valve H21 and the FC outlet valve H22 to lead the fuel gas remaining in the fuel gas supply passage 31 and the fuel gas circulating passage 32 to the fuel cell 20 (S602). Concurrently with this, the control unit 50 supplies the oxidant gas to the fuel cell 20 by rotating the air compressor 40. The fuel gas introduced into the fuel cell 20 is consumed by electric power generation. Furthermore, the control unit 50 purges the fuel gas to decrease the impurity concentration of the fuel gas circulating through the fuel cell 20 by opening the purge valve H51 at appropriate time intervals. It then determines whether the pressure detected by the pressure sensor P5 drops to a level equal to or lower than a target pressure P5AE (S603). The target pressure P5AE is preferably set to a level that does not cause a cross leak of the fuel gas into the cathode during the system halt. If the pressure detected by the pressure sensor P5 drops to a level equal to or lower than the target pressure P5AE (S603: YES), the control unit 50 closes the FC inlet valve H21, the FC outlet valve H22, and the purge valve H51 and stops the air compressor 40 and the hydrogen pump 63 to stop the electric power generation (S604).

Figure 14:
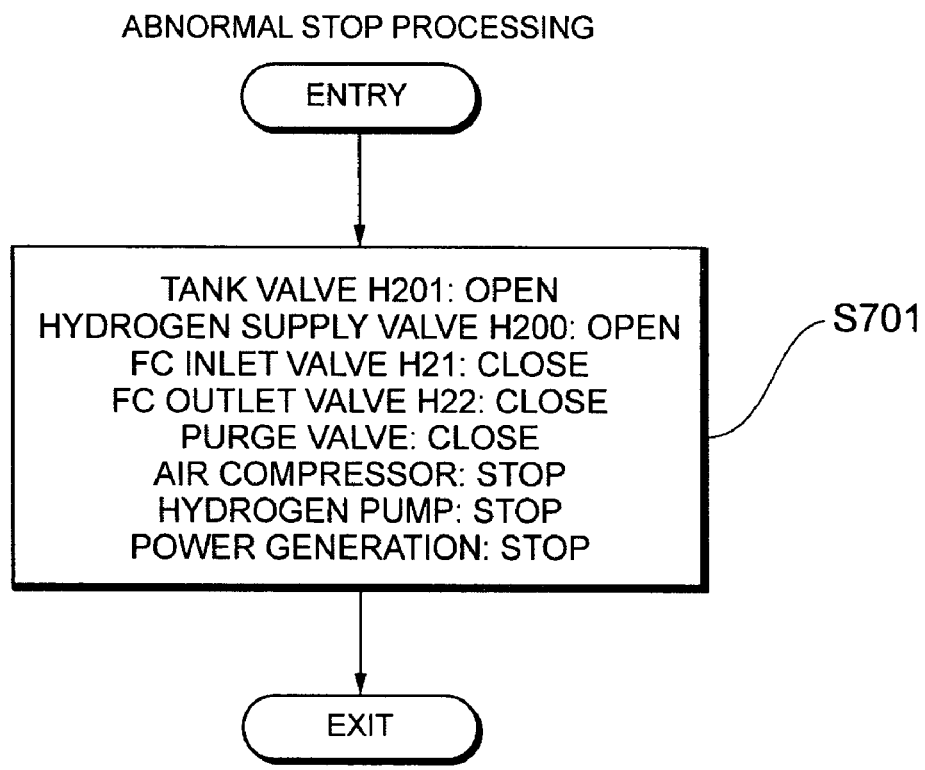
FIG. 14 is an abnormal stop routine.

Referring to FIG. 14, there is shown a flowchart of an abnormal stop routine (S112). If it is determined that there is a gas leak (S210, S446, S456, S446, and S475) in the above gas leak judgment (S102, S106, and S109), the abnormal stop routine is called. After the abnormal stop routine is called, the control unit 50 closes all valves arranged in the fuel gas supply system, namely the tank valve H201, the hydrogen supply valve H200, the FC inlet valve H21, the FC outlet valve H22, and the purge valve H51 and stops the air compressor 40 and the hydrogen pump 63 to stop the electric power generation (S701).

According to this embodiment, in the case where the electric power generation of the fuel cell 20 and the electric power consumption of the auxiliary devices result in an insufficient consumption of the fuel gas, the consumption of the fuel gas can be accelerated by increasing the electric power consumption of the auxiliary devices. Thereby, a rapid gas leak judgment can be achieved.

INDUSTRIAL APPLICABILITY

According to the present invention, in the case where the electric power generation of the fuel cell and the electric power consumption of the auxiliary devices result in an insufficient consumption of reaction gas, the consumption of the reaction gas can be accelerated by increasing the electric power consumption of the auxiliary devices. Thereby, rapid failure detection and judgment of the reaction gas passage can be achieved. Therefore, the present invention can be widely used for a fuel cell system having such a need and a failure judgment method of the fuel cell system.

I claim:

1. A fuel cell system comprising:
   a judgment unit which makes a failure judgment in a reaction gas passage based on a pressure changing state of reaction gas in a failure detection portion by (i) consuming the reaction gas in the failure detection portion of the reaction gas passage by means of a fuel cell and (ii) causing auxiliary devices supporting the fuel cell system or an auxiliary inverter to consume electric power generated by the fuel cell;
   a secondary battery that receives at least a portion of the electric power generated by the fuel cell;
   a control unit programmed to increase consumption of the reaction gas in the failure detection portion by increasing electric power consumption of the auxiliary devices supporting the fuel cell system or the auxiliary inverter when the electric power generation of the fuel cell exceeds a total sum of chargeable power of the secondary battery and the electric power consumption of the auxiliary devices,
   wherein the electric power generation of the fuel cell is the power that is generated by consuming the reaction gas in the failure detection portion of the reaction gas passage.

2. A fuel cell system according to claim 1, further comprising an inverter for converting DC power generated by the fuel cell to AC power and supplying the AC power to the auxiliary devices, wherein the control unit is programmed to increase a heat loss of the inverter to increase the consumption of the electric power generated by the fuel cell.

3. A fuel cell system according to claim 1, further comprising an air compressor for supplying oxidant gas to the fuel cell as one of the auxiliary devices, wherein the control unit is programmed to inhibit an increase in the flow rate of oxidant gas supplied from the air compressor to the fuel cell if the temperature of the fuel cell is equal to or higher than a predetermined value.

4. A fuel cell system according to claim 3, further comprising an inverter for converting DC power generated by the fuel cell to AC power and supplying the AC power to the auxiliary devices, wherein the control unit is programmed to increase a heat loss of the inverter to increase the consumption of the electric power generated by the fuel cell.

5. A fuel cell system according to claim 1, further comprising an auxiliary cooler for cooling the fuel cell as one of the auxiliary devices, wherein the control unit controls auxiliary devices other than the auxiliary cooler based on a degree of decrease in temperature of the fuel cell caused by an increase in the electric power consumption of the auxiliary cooler.

6. A fuel cell system according to claim 5, further comprising an inverter for converting DC power generated by the fuel cell to AC power and supplying the AC power to the auxiliary devices, wherein the control unit is programmed to increase a heat loss of the inverter to increase the consumption of the electric power generated by the fuel cell.

7. A fuel cell system according to claim 5, further comprising a heat exchanger capable of exchanging heat with refrigerant which cools the fuel cell as one of the auxiliary devices, wherein the control unit is programmed to raise the temperature of the refrigerant by increasing the electric power consumption of the heat exchanger if the temperature of the fuel cell is equal to or lower than a predetermined value.

8. A fuel cell system according to claim 7, further comprising an inverter for converting DC power generated by the fuel cell to AC power and supplying the AC power to the auxiliary devices, wherein the control unit is programmed to increase a heat loss of the inverter to increase the consumption of the electric power generated by the fuel cell.

9. A fuel cell system according to claim 5, further comprising an air compressor for supplying oxidant gas to the fuel cell as one of the auxiliary devices, wherein the control unit is programmed to inhibit an increase in the flow rate of oxidant gas supplied from the air compressor to the fuel cell if the temperature of the fuel cell is equal to or higher than a predetermined value.

10. A fuel cell system according to claim 9, further comprising an inverter for converting DC power generated by the fuel cell to AC power and supplying the AC power to the auxiliary devices, wherein the control unit is programmed to increase a heat loss of the inverter to increase the consumption of the electric power generated by the fuel cell.

11. A failure judgment method of a fuel cell system in which a failure judgment in a reaction gas passage is made based on a pressure changing state of reaction gas in a failure detection portion by (i) consuming the reaction gas in the failure detection portion of the reaction gas passage by means of a fuel cell and (ii) causing auxiliary devices supporting the fuel cell system or an auxiliary inverter to consume electric power generated by the fuel cell, the method comprising:
storing at least a portion of the electric power generated by the fuel cell in a secondary battery;
increasing consumption of the reaction gas in the failure detection portion by increasing electric power consumption of the auxiliary devices supporting the fuel cell system or the auxiliary inverter when the electric power generation of the fuel cell exceeds a total sum of chargeable power of the secondary battery and the electric power consumption of the auxiliary devices,
wherein the electric power generation of the fuel cell is the power that is generated by consuming the reaction gas in the failure detection portion of the reaction gas passage.

12. A failure judgment method of the fuel cell system according to claim 11, wherein:
the fuel cell system further includes an inverter for converting DC power generated by the fuel cell to AC power and then supplying the AC power to the auxiliary devices; and
the consumption of the electric power generated by the fuel cell is increased by increasing the heat loss of the inverter.

13. A failure judgment method of the fuel cell system according to claim 11, wherein:
the fuel cell system further includes an air compressor for supplying oxidant gas to the fuel cell as one of the auxiliary devices; and
an increase in the flow rate of oxidant gas supplied from the air compressor to the fuel cell is inhibited if the temperature of the fuel cell is equal to or higher than a predetermined value.

14. A failure judgment method of the fuel cell system according to claim 13, wherein:
the fuel cell system further includes an inverter for converting DC power generated by the fuel cell to AC power and then supplying the AC power to the auxiliary devices; and
the consumption of the electric power generated by the fuel cell is increased by increasing the heat loss of the inverter.

15. A failure judgment method of the fuel cell system according to claim 11, wherein:
the fuel cell system includes an auxiliary cooler for cooling the fuel cell as one of the auxiliary devices; and
auxiliary devices other than the auxiliary cooler are controlled based on a degree of decrease in temperature of the fuel cell caused by an increase in the electric power consumption of the auxiliary cooler.

16. A failure judgment method of the fuel cell system according to claim 15, wherein:
the fuel cell system further includes an inverter for converting DC power generated by the fuel cell to AC power and then supplying the AC power to the auxiliary devices; and
the consumption of the electric power generated by the fuel cell is increased by increasing the heat loss of the inverter.

17. A failure judgment method of the fuel cell system according to claim 15, wherein:
the fuel cell system further includes a heat exchanger capable of exchanging heat with refrigerant which cools the fuel cell as one of the auxiliary devices; and
the temperature of the refrigerant is raised by increasing the electric power consumption of the heat exchanger if the temperature of the fuel cell is equal to or lower than a predetermined value.

18. A failure judgment method of the fuel cell system according to claim 17, wherein:
the fuel cell system further includes an inverter for converting DC power generated by the fuel cell to AC power and then supplying the AC power to the auxiliary devices; and
the consumption of the electric power generated by the fuel cell is increased by increasing the heat loss of the inverter.

19. A failure judgment method of the fuel cell system according to claim 15, wherein:
the fuel cell system further includes an air compressor for supplying oxidant gas to the fuel cell as one of the auxiliary devices; and
an increase in the flow rate of oxidant gas supplied from the air compressor to the fuel cell is inhibited if the temperature of the fuel cell is equal to or higher than a predetermined value.

20. A failure judgment method of the fuel cell system according to claim 19, wherein:
the fuel cell system further includes an inverter for converting DC power generated by the fuel cell to AC power and then supplying the AC power to the auxiliary devices; and
the consumption of the electric power generated by the fuel cell is increased by increasing the heat loss of the inverter.

* * * * *